US012623175B2

(12) United States Patent
Lee et al.

(10) Patent No.: US 12,623,175 B2
(45) Date of Patent: May 12, 2026

(54) AIR CLEANER

(71) Applicant: LG ELECTRONICS INC., Seoul (KR)

(72) Inventors: Kunyoung Lee, Seoul (KR); Bohyun Kim, Seoul (KR); Jaewan Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 269 days.

(21) Appl. No.: 18/221,067

(22) Filed: Jul. 12, 2023

(65) Prior Publication Data

US 2024/0017199 A1     Jan. 18, 2024

(30) Foreign Application Priority Data

Jul. 14, 2022     (KR) ......................... 10-2022-0087012

(51) Int. Cl.
F24F 8/80          (2021.01)
B01D 46/00          (2022.01)
     (Continued)

(52) U.S. Cl.
CPC ..... B01D 46/0049 (2013.01); B01D 46/2403 (2013.01); F24F 1/0328 (2019.02);
     (Continued)

(58) Field of Classification Search
CPC ............ B01D 46/0049; B01D 46/2403; B01D 2273/30; B01D 46/2411; F24F 1/0328;
     (Continued)

(56) References Cited

U.S. PATENT DOCUMENTS 2,824,429 A * 2/1958 Zucker .................. F24F 13/075
                                                              454/313
8,414,670 B2  4/2013 Lee
                (Continued)

FOREIGN PATENT DOCUMENTS

CN          101808712          8/2010
CN          104329748          2/2015
                (Continued)

OTHER PUBLICATIONS

Korean Office Action dated Mar. 22, 2024 issued in Application No. 10-2022-0087011.

(Continued)

*Primary Examiner* — Frank M Lawrence, Jr.
(74) *Attorney, Agent, or Firm* — KED & ASSOCIATES, LLP

(57) ABSTRACT

An air cleaner includes: a first body having an inlet and an outlet that is open at top; a filter disposed inside the first body and facing the inlet; a blower fan disposed between the inlet and the outlet, inside the first body, to generate an air flow from the inlet to the outlet; a blower motor disposed inside the first body and configured to rotate the blower fan; and a second body spaced upward from the outlet and disposed over the first body, wherein the first body includes an outlet grille that is disposed on the outlet and has a plurality of vanes extending from an upper end of a circumferential wall of the first body toward a central portion of the first body, and the outlet grille is inclined upward toward the central portion of the first body from the circumferential wall of the first body.

17 Claims, 16 Drawing Sheets

(51) Int. Cl.

| | |
|---|---|
| *B01D 46/24* | (2006.01) |
| *F24F 1/0328* | (2019.01) |
| *F24F 8/10* | (2021.01) |
| *F24F 13/075* | (2006.01) |
| *H02J 50/10* | (2016.01) |

(52) U.S. Cl.
CPC .............. *F24F 8/10* (2021.01); *F24F 13/075* (2013.01); *B01D 2273/30* (2013.01); *H02J 50/10* (2016.02)

(58) Field of Classification Search
CPC .......... F24F 8/10; F24F 13/075; F24F 13/082; F24F 13/20; F24F 8/80; F24F 8/108; F24F 13/00; F24F 13/06; F24F 13/28; F24F 2013/205; F24F 2221/28; H02J 50/10; A47B 37/00
USPC .................. 55/410, 413, 414, 416, 447, 453
See application file for complete search history.

(56) References Cited

U.S. PATENT DOCUMENTS

| | | | |
|---|---|---|---|
| 2011/0037368 A1 | 2/2011 | Huang | |
| 2015/0108364 A1 | 4/2015 | Hanai et al. | |
| 2015/0231542 A1 | 8/2015 | Wennerstrom et al. | |
| 2015/0273376 A1 | 10/2015 | Sohn et al. | |
| 2017/0122583 A1 | 5/2017 | Lee et al. | |
| 2017/0234572 A1* | 8/2017 | Harris ..................... F24F 13/14 |
| | | | 454/248 |
| 2017/0248153 A1 | 8/2017 | Park et al. | |
| 2018/0001248 A1 | 1/2018 | Jung et al. | |
| 2018/0283728 A1* | 10/2018 | Li ........................... F24F 13/06 |
| 2019/0226698 A1 | 7/2019 | Kim et al. | |
| 2020/0289968 A1 | 9/2020 | Scholten et al. | |
| 2020/0298160 A1 | 9/2020 | Jeon et al. | |
| 2020/0298165 A1 | 9/2020 | Kang et al. | |
| 2021/0207847 A1 | 7/2021 | Lee et al. | |
| 2021/0387125 A1 | 12/2021 | Scholten et al. | |
| 2022/0032222 A1 | 2/2022 | Park et al. | |
| 2022/0154953 A1 | 5/2022 | Herskovitz et al. | |
| 2022/0184542 A1 | 6/2022 | Kim et al. | |
| 2022/0184543 A1 | 6/2022 | Choi et al. | |
| 2024/0426489 A1* | 12/2024 | Chen ....................... F24F 13/20 |

FOREIGN PATENT DOCUMENTS

| | | |
|---|---|---|
| CN | 206944336 | 1/2018 |
| CN | 109405123 | 3/2019 |
| CN | 210624810 | 5/2020 |
| CN | 112013489 | 12/2020 |
| CN | 212746822 | 3/2021 |
| CN | 113606721 | 11/2021 |
| CN | 113623807 | 11/2021 |
| CN | 113465085 | 12/2021 |
| CN | 216409143 | 4/2022 |
| CN | 216409243 | 4/2022 |
| CN | 114484709 | 5/2022 |
| CN | 114521224 | 5/2022 |
| CN | 114526534 | 5/2022 |
| CN | 216744764 | 6/2022 |
| EP | 3832217 | 6/2021 |
| GB | 2286978 | 9/1995 |
| JP | 2006-320447 | 11/2006 |
| JP | 2007-127909 | 5/2007 |
| JP | 2014-202384 | 10/2014 |
| JP | 2022-025054 | 2/2022 |
| KR | 10-2016-0025975 | 3/2016 |
| KR | 10-1652363 | 9/2016 |
| KR | 10-2017-0051276 | 5/2017 |
| KR | 10-2017-0131734 | 11/2017 |
| KR | 10-2018-0065164 | 6/2018 |
| KR | 10-1867084 | 6/2018 |
| KR | 10-2019-0119564 | 10/2019 |
| KR | 10-2019-0137048 | 12/2019 |
| KR | 10-2020-0004167 | 1/2020 |
| KR | 10-2139575 | 7/2020 |
| KR | 20-2020-0002055 | 9/2020 |
| KR | 10-2020-0111895 | 10/2020 |
| KR | 10-2021-0105856 | 8/2021 |
| KR | 10-2289453 | 8/2021 |
| KR | 10-2021-0110427 | 9/2021 |
| KR | 10-2021-0137720 | 11/2021 |
| KR | 10-2021-0140930 | 11/2021 |
| KR | 10-2022-007355 | 1/2022 |
| KR | 10-2022-0007363 | 1/2022 |
| KR | 10-2022-0007993 | 1/2022 |
| KR | 10-2022-0018766 | 2/2022 |
| KR | 10-2022-0018994 | 2/2022 |
| KR | 10-2022-0022038 | 2/2022 |
| KR | 10-2022-0059885 | 5/2022 |
| KR | 10-2022-0076876 | 6/2022 |
| WO | WO 2017/074128 | 5/2017 |
| WO | WO 2017/146353 | 8/2017 |
| WO | WO 2018/016883 | 1/2018 |
| WO | WO 2021/246949 | 12/2021 |
| WO | WO 2021/246950 | 12/2021 |

OTHER PUBLICATIONS

Korean Office Action dated Mar. 22, 2024 issued in Application No. 10-2022-0087010.
European Search Report dated Nov. 28, 2023, issued in Application No. 23185161.9.
European Search Report dated Dec. 1, 2023, issued in Application No. 23185203.9.
European Search Report dated Dec. 4, 2023, issued in Application No. 23185183.3.
Extended European Search Report dated Nov. 16, 2023 issued in Application No. 23185149.4.
European Search Report dated Dec. 7, 2023, issued in Application No. 23185186.6.
Korean Office Action dated Mar. 19, 2024, issued in Application No. 10-2022-0087012.
Korean Office Action dated Mar. 19, 2024, issued in Application No. 10-2022-0087014.
European Search Report dated Feb. 13, 2024, issued in Application No. 23201527.1.
European Search Report dated Feb. 13, 2024, issued in Application No. 23202298.8.
Korean Office Action dated Apr. 21, 2024, issued in Application No. 10-2022-0128429.
Korean Office Action dated Apr. 21, 2024, issued in Application No. 10-2022-0130152.
Korean Office Action dated Apr. 16, 2024 issued in Application No. 10-2022-0087019.
Korean Office Action dated Apr. 16, 2024 issued in Application No. 10-2022-0087018.
Korean Office Action dated Apr. 16, 2024 issued in Application No. 10-2022-0087017.
Korean Office Action dated Apr. 16, 2024 issued in Application No. 10-2022-0087016.
Korean Office Action dated Apr. 16, 2024 issued in Application No. 10-2022-0087015.
Action dated Feb. 20, 2024 issued in U.S. Appl. No. 18/221,200.
Korean Notice of Allowance dated Nov. 1, 2024, issued in Application No. 10-2022-0087014.
European Search Report dated Dec. 13, 2023 issued in Application No. 23185155.1.
European Search Report dated Dec. 7, 2023, issued in Application No. 23185181.7.
European Search Report dated Dec. 8, 2023, issued in Application No. 23185189.0.
U.S. Appl. No. 18/221,031, filed Jul. 12, 2023.
U.S. Appl. No. 18/221,067, filed Jul. 12, 2023.
U.S. Appl. No. 18/221,110, filed Jul. 12, 2023.
U.S. Appl. No. 18/221,152, filed Jul. 12, 2023.
U.S. Appl. No. 18/221,200, filed Jul. 12, 2023.

(56)         References Cited

OTHER PUBLICATIONS

U.S. Appl. No. 18/221,540, filed Jul. 13, 2023.
U.S. Appl. No. 18/221,556, filed Jul. 13, 2023.
U.S. Appl. No. 18/221,576, filed Jul. 13, 2023.
U.S. Appl. No. 18/221,589, filed Jul. 13, 2023.
U.S. Appl. No. 18/377,447, filed Oct. 6, 2023.
U.S. Appl. No. 18/378,256, filed Oct. 10, 2023.
Korean Notice of Allowance dated Mar. 17, 2026 issued in Application No. 10-2022-0087012.

* cited by examiner

AIR CLEANER

CROSS-REFERENCE TO RELATED APPLICATION(S)

This application claims priority under 35 U.S.C. § 119 to Korean Application No. 10-2022-0087012, filed in Korea on Jul. 14, 2022, whose entire disclosure(s) is/are hereby incorporated by reference.

BACKGROUND

1. Field

An air cleaner, and more particularly, to an air cleaner capable of utilizing a top space of the air cleaner is disclosed herein.

2. Background

An air cleaner is a device that may generate an air flow and filter the flowing air to improve the quality of indoor air in a certain space. One type of air cleaner may have an inlet provided on one side, an outlet provided on another side, and a filter provided therein. Another type of air cleaner may have the outlet at a top and filtered air, which is discharged upward, may flow outward in all directions so as to quickly improve the quality of air in an indoor space. When the outlet is provided at the top, a fan for controlling a wind direction may be separately provided at the top to blow the filtered air a long distance. An air cleaner may require a considerable volume in order to achieve desirable air cleaning performance in a certain space, and as the large-volume air cleaner may occupy a significant portion of the space, the space utilization may be reduced accordingly.

A first air cleaner discussed in Korean Laid-Open Patent Publication No. 2021-0140930 (published on Nov. 23, 2021) includes a cylindrical body; an outlet that is open at the top of the body; an annular outlet grille provided with the outlet and defining a top or upper surface of the body; and an operating unit disposed on a flat surface surrounded by the annular outlet grille. In the first air cleaner, the outlet is provided on the top surface of a body, which is disadvantageous as limiting a utility of a top surface of the air cleaner. In addition, the first air clear includes an operating unit that disposed at a central portion of the annular outlet and this operating unit makes it even more difficult to use the narrow flat surface of an upper end of the air cleaner.

A second air cleaner discussed in Korean Laid-Open Patent Publication No. 2022-0007363 (published on Jan. 18, 2022) includes an elongated cylindrical body; an outlet that is open at the top of the body; an annular outlet grille at which the outlet is formed and defining a top surface of the body; and a flat surface surrounded by the annular outlet grille. However, the body of the second air cleaner has a high height, which is disadvantageous to utilize the top surface of the body. In addition, the top surface of the body is narrow, which makes it difficult to place items. When a structure having a larger area than the top surface is placed on the top surface, the outlet is covered, which results in reducing the performance of the air cleaner.

The above references are incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein.

DETAILED DESCRIPTION

Figure 1:
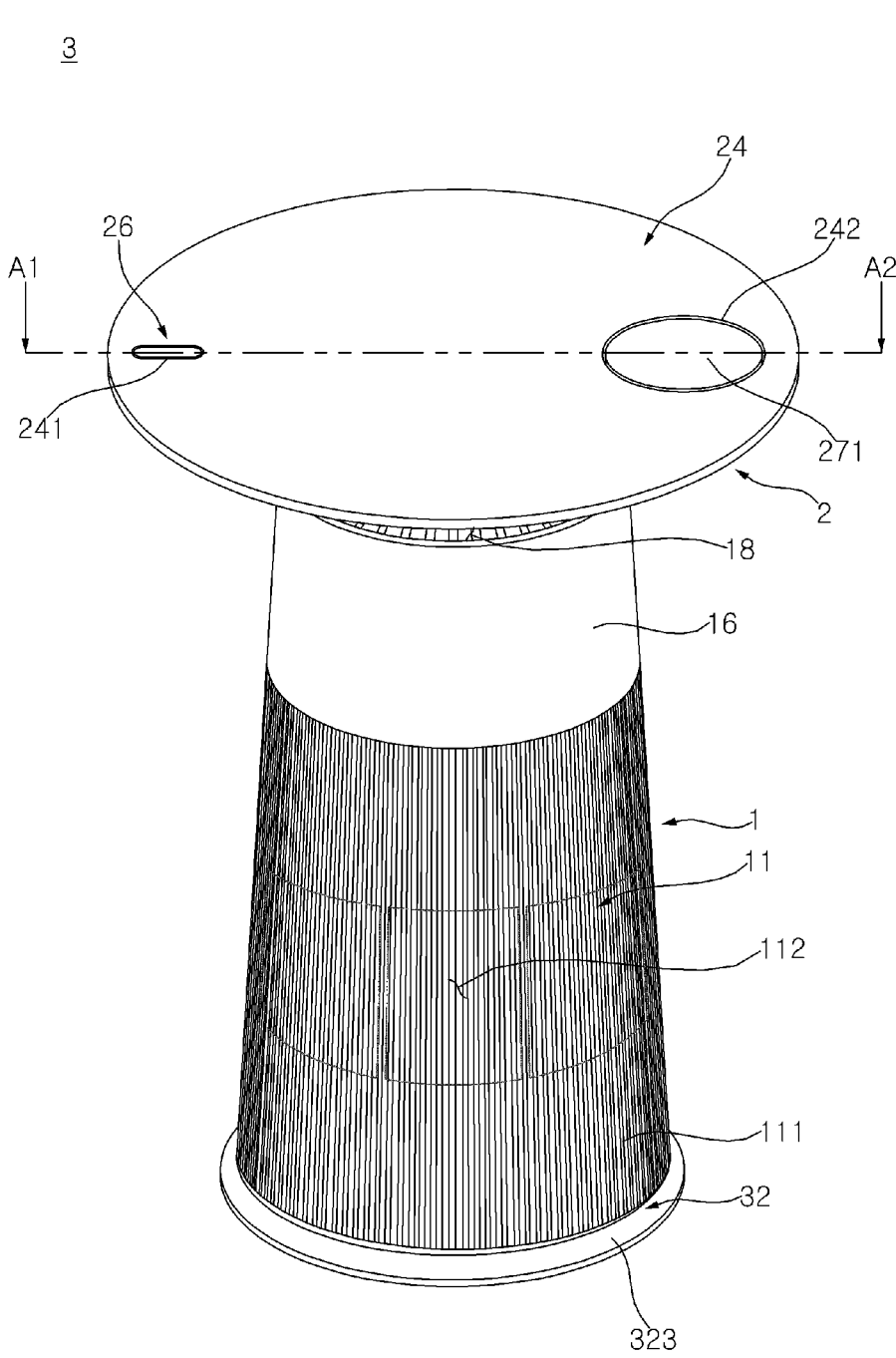
FIG. 1 is a perspective view of an air cleaner according to an embodiment of the present disclosure.

Description will now be given in detail according to exemplary embodiments disclosed herein, with reference to the accompanying drawings. For the sake of brief description with reference to the drawings, the same or equivalent components are provided with the same or similar reference numerals, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms "first", "second", etc. may be used herein to describe various elements, these elements should not be limited by these terms. These terms are only used to distinguish one element from another. As used herein, a singular representation is intended to include a plural representation unless the context clearly indicates otherwise.

It will be understood that when a component is referred to as being "connected to" or "coupled to" another component, it may be directly connected to or coupled to another component, or intervening components may be present. On the other hand, when a component is referred to as being "directly connected to" or "directly coupled to" another component, there are no intervening components present.

Hereinafter, an air cleaner 3 will be described with reference to FIG. 1. An air cleaner 3 includes a first body 1 having an inlet 112 and an outlet 17 (see FIG. 3). The first body 1 may be elongated in a vertical direction. The first body 1 may have greater height than width. For example, the first body 1 may have a substantially cylindrical or conical shape that is elongated in a height direction.

The first body 1 may include a circumferential wall formed along its circumference. The circumferential wall may be an outer wall of the first body 1. The circumferential wall may include an upper housing 16. The circumferential wall may include a lower housing 11. For example, the first body 1 may include an upper housing 16 and a lower housing 11, and the circumferential wall may include outer walls of the upper housing 16 and the lower housing 11. For example, the circumferential wall may have a cylindrical shape elongated in a height direction.

The first body 1 may be formed in a cylindrical shape, a cuboid shape, a pyramid shape, or a cube shape. However, the shape of the first body 1 is not limited thereto and may have various shapes. The first body 1 may decrease in width toward the top. For example, the first body 1 may have a cylindrical shape whose width decreases upward.

The inlet 112 may be formed in the circumferential wall of the first body 1. A portion of the circumferential wall of the first body 1 may be open to define the inlet 112. The inlet 112 may allow an inside and outside of the first body 1 to communicate with each other. For example, a portion of the circumferential wall of the first body 1 may be cut out such that the inside and outside of the first body 1 communicate with each other via the inlet 112, allowing air to be supplied from the outside to the inside through the inlet 112.

The inlet 112 may be formed along a circumference of the circumferential wall of the first body 1. The inlet 112 may be formed on one side of the circumferential wall of the first body 1. A plurality of inlets 112 may be provided in the circumferential wall of the first body 1. For example, with respect to a center in a height direction of the first body, four inlets 112 may be open in all directions on the circumferential wall.

The inlet 112 may be disposed at a lower side or part of the first body 1. For example, the inlet 112 may be spaced downward from a center in a height direction of the first body 1, and may be formed by opening a portion of the circumferential wall. Accordingly, contaminated air with high density may be easily introduced into the air cleaner through the inlet disposed at the lower part of the first body 1.

The inlet 112 may be provided with a louver 111. The louver 111 may be disposed outside the inlet 112. The louver 111 may be formed along the circumference of the circumferential wall of the first body 1. The louver 111 may be elongated in a height direction of the first body 1. A plurality of louvers 111 may be disposed along the circumference of the circumferential wall. Air may flow through gaps between the plurality of louvers 111. For example, a plurality of the louvers 111 elongated in the height direction of the first body 1 may be provided along the circumference of the circumferential wall of the first body 1, and outside air may be introduced into gaps formed between the plurality of louvers 111. Accordingly, dust or foreign particles introduced into the inlet 1 may be filtered out by the louver 111.

The inlet 112 may be formed on one side of the first body 1, and the outlet 17 may be formed on another side of the first body 1. The outlet 17 may be disposed to be spaced apart from the inlet 112.

The outlet 17 may be formed by an opening the first body 1. A top or upper surface and the circumferential wall of the first body 1 may be open to define the outlet 17. The first body 1 may be open at the top to define a portion of the outlet 17. For example, the outlet 17 may be formed by the first body 1 being open at the top.

The inlet 112 may be open on one side, and the outlet 17 may be open on another side. For example, the inlet 112 may be open on the circumferential wall of the first body 1, and the outlet 17 may be open at the top of the first body 1. As air is drawn into a lateral surface of the first body 1 and is then discharged upward, the discharged air may be prevented from being reintroduced into the inlet 112.

The outlet 17 may have the shape of a transverse section of the first body 1. The outlet 17 may be smaller than a cross-section of the transverse section of the first body 1. A portion of the upper surface of the first body 1 may be open to define the outlet 17. For example, the outlet 17 may be formed in an annular shape at the top of the first body 1 with a cylindrical shape.

The first body 1 may include the lower housing 11. The lower housing 11 may define a portion of the circumferential wall of the first body 1. The inlet 112 may be formed in a circumferential wall of the lower housing 11. The lower housing 11 may have a shape that is narrow at the top and wide at the bottom. The louver 111 may be disposed on the circumferential wall of the lower housing 11. The louver 111 may be disposed at the inlet 112 formed in the circumferential wall of the lower housing 11. For example, the lower housing 11 may include a circumferential wall that is provided with the inlet 112, and the louver 111 that extends in the height direction of the first body 1 and is disposed along the circumference of the circumferential wall.

The first body 1 may include the upper housing 16. The upper housing 16 may be a portion of the first body 1. The upper housing 16 may define a portion of the circumferential wall. For example, the circumferential wall of the first body 1 may include the lower housing 11 and the upper housing 16.

An outlet grille 18 may be connected to the upper housing 16. For example, the upper housing 16 may define an upper portion of the first body 1, and the outlet grille 18 may be connected to an upper edge of the upper housing 16.

The air cleaner 3 may include a second body 2 (see FIG. 2) disposed over the first body 1. A top or upper surface of the second body 2 may be formed substantially flat. The second body 2 may have the shape of a table. For example, the second body 2 may have the shape of a table with a flat top surface. Accordingly, space utilization of the air cleaner may be increased.

The second body 2 may cover the first body 1. The second body 2 may extend in a lateral direction. A width of the second body 2 may be greater than a width of the first body 1. An edge of the second body 2 may be located outward from a center axis of the air cleaner 3 relative to the circumferential wall of the first body 1. For example, the second body 2 may be greater in width than the first body 1, and the second body 2 may have the shape of a substantially circular, elliptical, or oval table with an upper edge located outward relative to the circumferential wall of the first body 1.

The second body 2 may include a top or upper surface. The upper surface of the second body 2 may be formed flat.

The second body 2 may include a plate 24 having a flat surface. The plate 24 may cover the second body 2. For example, the plate 24 may be a disk that extends in the lateral direction to cover the second body 2.

The air cleaner 3 may include an indicator (or indicator light) 26. The indicator 26 may provide a user with information about the air cleaner 3. The indicator 26 may visually convey information about the air cleaner 3 to the user. For example, the indicator 26 may be a display that visually displays operation state information of the air cleaner 3, such as to output a light when the air cleaner is operating.

The indicator 26 may be provided on one side of the air cleaner 3. The indicator 26 may be disposed at the second body 2. The indicator 26 may face upward. The indicator 26 may be disposed at the upper surface of the second body 2. The indicator 26 may be inserted into a slot 241 formed in the upper surface of the second body 2. For example, the indicator 26 may be elongated, and may be disposed at the slot 241 formed in the upper surface of the second body 2.

The air cleaner 3 may include a charging pad 271. The charging pad 271 may charge electronic devices. The charging pad 271 may wirelessly charge an electronic device without a connection terminal. For example, the charging pad 271 may be a wireless charging module that inductively charges electronic devices.

The charging pad 271 may be provided on one side of the air cleaner 3. The charging pad 271 may be disposed on one side of the second body 2. The charging pad 271 may be disposed at the upper surface of the second body 2. The charging pad 271 may define the upper surface of the second body 2. The charging pad 271 may be inserted into a pad hole 242 formed in the second body 2. For example, the charging pad 271 may be inserted into a circular pad hole 242 formed in the upper surface of the second body 2 to thereby define the upper surface of the second body 2.

The air cleaner 3 may include a base 32 to support the first body 1. The base 32 may support the weight of the air cleaner 3. The base 32 may support the weight of the first body 1 and the second body 2. The base 32 may be disposed at a bottom of the first body 1. The base 32 may define a lower end of the first body 1. A width of the base 32 may be greater than the width of the first body 1. An end of the base 32 may be located outward relative to the circumferential wall of the first body 1. For example, the first body 1 may have a shape that is narrow at the top and wide at the bottom, and the base 32 may be greater in width than the lower end of the first body 1.

The base 32 may extend laterally. The base 32 may include an inclined wall 323 inclined downward toward the outside. An edge of the inclined wall 323 may be located outward relative to the circumferential wall of the first body 1. Accordingly, stability of the air cleaner 3 may be improved.

Figure 2:
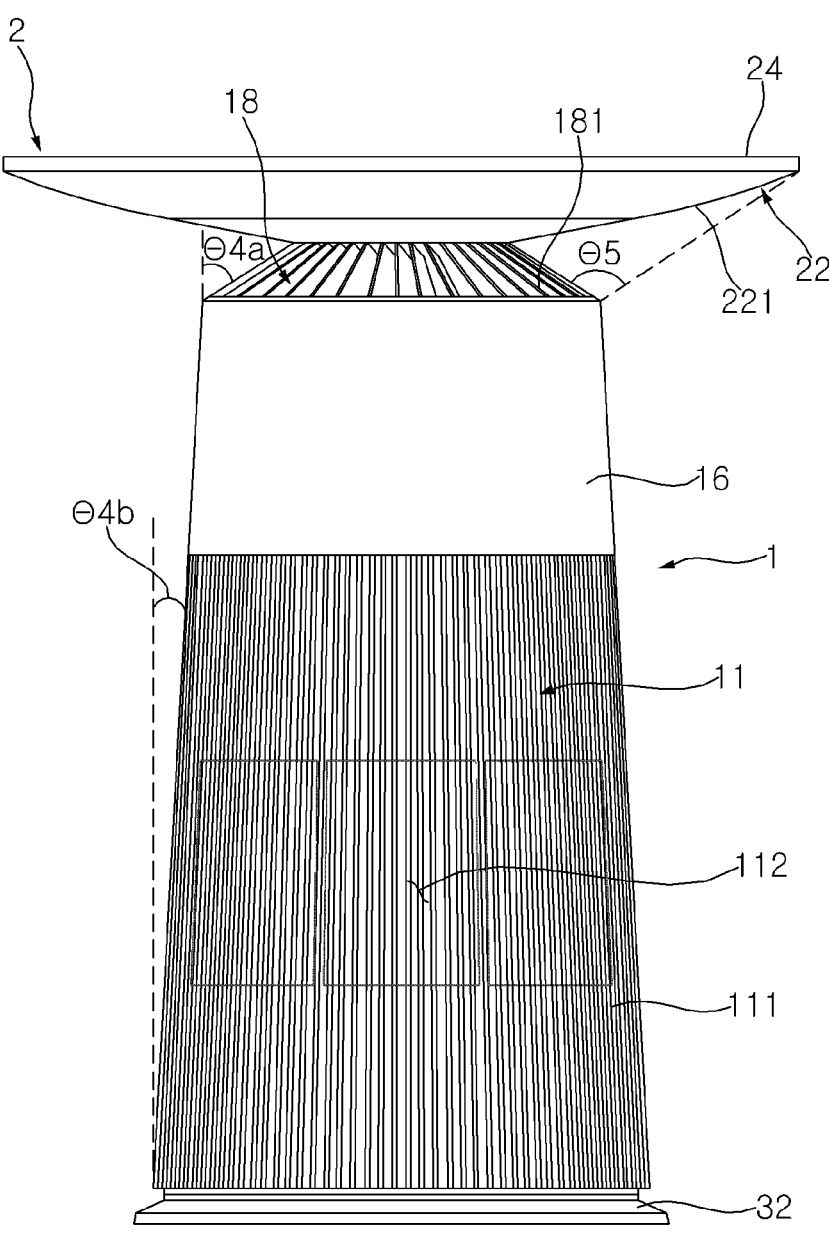
FIG. 2 is an elevational view of an air cleaner according to an embodiment of the present disclosure.

Referring to FIG. 2, the air cleaner 3 will be described below. The air cleaner 3 may include the outlet 17 (see FIG. 3) that is open at the top. The outlet 17 may be disposed at the top of the first body 1. The outlet 17 may be disposed to face the second body 2. The outlet 17 may be disposed toward a bottom or lower surface of the second body 2. For example, the outlet 17 may be open at the top of the first body 1, and may face the lower surface of the second body 2. Accordingly, discharged air may flow along the lower surface of the second body 2, thereby preventing the discharged air from being reintroduced into the inlet 112.

The outlet 17 may be disposed obliquely. The outlet 17 may be tilted. The outlet 17 may be open at the top of the first body 1, and may be tilted toward the outside of the first body 1. The outlet 17 may be inclined to one side from a connection point between the second body 2 and the first body 1. For example, the outlet 17 with an annular shape may be inclined downward toward the outside of the first body 1 from the connection portion between the first body 1 and the second body 2. Accordingly, discharged air may flow along the lower surface of the second body 2, thereby preventing the discharged air from being reintroduced into the inlet 112.

The outlet 17 may be formed in an annular shape. The outlet 17 may have the shape of a ring with respect to an axis of a blower fan 12. In other examples, the outlet 17 may have a quadrangular shape, or the outlet 17 may have a circular shape. The shape of the outlet 17 is not limited thereto, and may be formed in various shapes. For example, the first body 1 may have a cylindrical shape elongated in the height direction, and the outlet 17 may have an annular shape that is open at the top of the first body 1. Accordingly, a discharge air flow may be generated in all directions, allowing the efficiency of the air cleaner to be increased.

The outlet grille 18 may be disposed on the outlet 17. The outlet grille 18 may be disposed at the upper portion of the first body 1. The outlet grille 18 may define the upper portion of the first body 1. For example, the outlet 17 may be an annular outlet 17 that is open at the top of the first body 1, and an annular outlet grille 18 may be disposed on of the outlet 17.

The outlet grille 18 may include a plurality of vanes 181 extending in an elongated manner. The plurality of vanes 181 may be elongated in a radial direction of the first body 1. The plurality of vanes 181 may be radially arranged on the outlet grille 18. The plurality of vanes 181 may extend from the circumferential wall of the first body 1 toward a central portion of the first body 1. The plurality of vanes 181 may extend from a post (or extension) 21 side of the second body 2 toward the circumferential wall of the first body 1. For example, the outlet 17 and the outlet grille 18 may each have an annular shape, and the plurality of vanes 181 may extend from an upper end of the circumferential wall of the first body 1 toward the central portion of the first body 1.

The outlet grille 18 may be inclined upward toward the central portion of the first body 1 in an inward direction from the circumferential wall of the first body 1. The outlet grille 18 may be inclined downward as a distance from a center of the first body 1 increases. The outlet grille 18 may be raised or elevated toward the inside of first body 1 from the outside of the first body 1. An inner circumference of the outlet grille 18 may be positioned higher than an outer circumference thereof. For example, the outlet grille 18 may have the shape of a cone with the top cut off, namely, a truncated cone shape, and may be provided with a plurality of vanes 181 arranged radially.

Each of the plurality of vanes 181 may be inclined such that an air flow blown up by the blower fan 12 is discharged obliquely upward along a circumferential direction of the first body 1. Each of the plurality of vanes 181 may be inclined such that an air flow blown up by the blower fan 12 is discharged obliquely upward along a rotation direction of the blower fan 12. For example, one surface of a vane 181 among the plurality of vanes 181 may be tilted with respect to a virtual vertical plane on which the central axis of the first body and one end of the vane are placed. One surface of the vane may be a positive pressure surface or a negative pressure surface of the vane. One end of the vane may be an upper end or a lower end of the vane. An upper end or a lower end of the vane may be parallel to the longitudinal direction of the vane.

Each of the plurality of vanes 181 may be inclined downward toward the outside of the first body 1 in a radially outward direction. A longitudinal direction of the vane 181 may be inclined downward toward the outside of the first body 1. The longitudinal direction refers to a direction in which the vane 181 extends from the central portion of the first body 1 toward the outside of the first body 1. The longitudinal direction may be a radial direction. The longitudinal direction of the vane 181 may be inclined upward or downward from a horizontal direction. The longitudinal direction of the vane 181 may run parallel to an imaginary surface of the outlet grille 18.

An imaginary straight line that connects a lower end in the longitudinal direction of the vane 181 and an end of a guide wall 221 may form an obtuse angle $\Theta5$ with the longitudinal direction of the vane 181. Alternatively, the imaginary straight line may be parallel to the longitudinal direction of the vane 181. Accordingly, air discharged through the outlet grille may be guided by the guide wall 221.

The circumferential sidewall wall of the first body 1 may be inclined inward toward the top. An angle $\Theta4a$ at which the vane 181 is inclined with respect to an up-and-down or vertical direction may be greater than an angle $\Theta4b$ at which the circumferential wall of the first body 1 is inclined inward with respect to the up-and-down direction.

Each of the plurality of vanes 181 may be elongated downward toward an outside in the radial direction of the first body 1. The second body 2 may extend in the lateral direction. The second body 2 may include a lower cover 22 defining an outer appearance of the table. The lower cover 22 may extend in the lateral direction. The lower cover 22 may include a lower surface extending laterally. The lower cover 22 may decrease in thickness toward an end thereof.

The lower cover 22 may include the guide wall 221 defining the lower surface thereof. The guide wall 221 may extend in the lateral direction. The guide wall 221 may extend from the upper portion of the first body 1. The guide wall 221 may extend to the outside of the first body 1. An edge of the guide wall 221 may be located outward relative to the circumferential wall of the first body 1. An outer circumferential end of the guide wall 221 may be located outward relative to an outer circumferential end of the outlet grille 18. The guide wall 221 may face downward. The guide wall 221 may face the first body 1 side. The guide wall 221 may be inclined. For example, the guide wall 221 may extend upward toward the outside of the first body 1.

The lower cover 22 may extend from one end of the outlet 17. The lower cover 22 may extend from one end of the outlet grille 18. One end of the outlet grille 18 may be connected to the lower cover 22. The lower cover 22 may be spaced upward from another end of the outlet grille 18. The outlet 17 and the guide wall 221 may form an acute angle.

The outlet grille 18 and the guide wall 221 may be connected to each other. An upper end of the outlet grille 18 may be connected to a lower end of the guide wall 221. The outlet grille 18 and the guide wall 221 may form an acute angle. The guide wall 221 may extend from one side of the outlet grille 18, and the outlet grille 18 and the guide wall 221 may form an acute angle on the one side. The angle formed by the guide wall 221 and the outlet grille 18 may increase from the one side toward the edge of the guide wall 221. For example, the outlet grille 18 disposed at the top of the first body 1 may be connected to the second body 2, and the outlet grille 18 and the guide wall 221 of the second body 2 may form an acute angle at a connection point. The vane 181 may form an acute angle with the guide wall 221.

Figure 3:
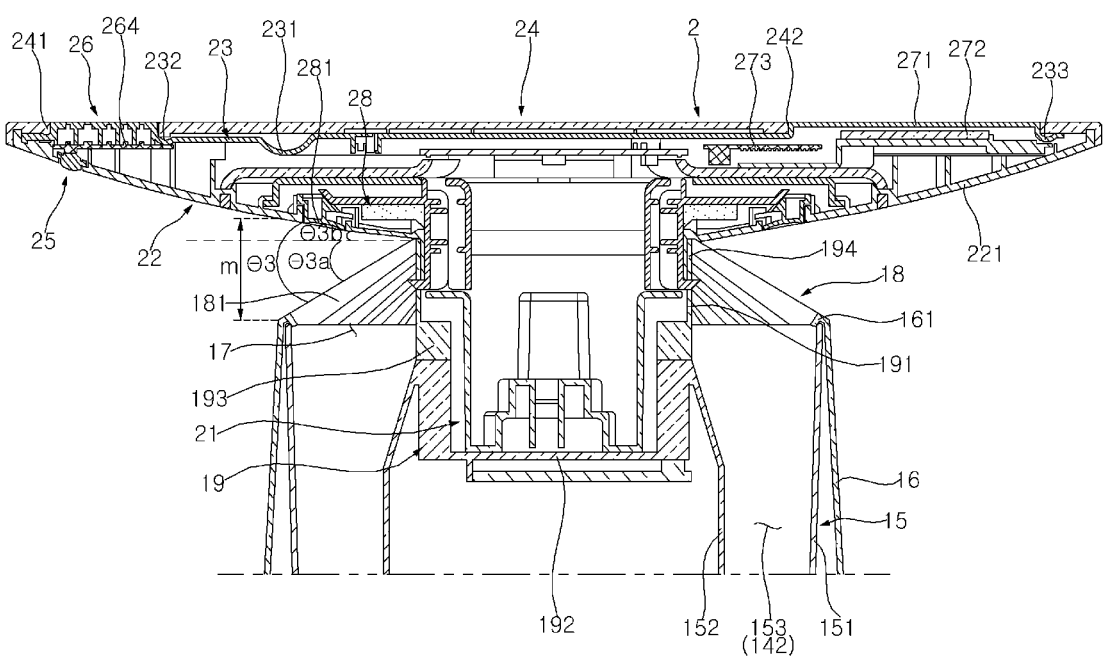
FIG. 3 is a cross-sectional view taken along a line A1-A2 of FIG. 1.

Referring to FIG. 3, the air cleaner 3 will be described below. The outlet grille 18 may be disposed toward the second body 2. The outlet grille 18 may face the second body 2. The outlet grille 18 may be disposed at the top of the first body 1. The outlet grille 18 may define the upper surface of the first body 1.

The outlet grille 18 may be disposed to be spaced apart from the second body 2. The outlet grille 18 may be spaced apart from the lower cover 22 of the second body 2. The outlet grille 18 may be spaced apart from the lower cover 22 by a predetermined distance m, and the lower cover 22 may be spaced upward from the outlet grille 18 by the predetermined distance m. The separation distance m between the lower cover 22 and the outlet grille 18 in the up-and-down direction may increase toward the outside in the radial direction of the first body 1. A separation distance m between the guide wall 221 and the outlet grille 18 in the up-and-down direction may increase toward the outside in the radial direction of the first body 1. For example, the outlet grille 18 may be inclined downward toward the outside of the first body 1, the lower cover 22 may be inclined upward toward the outside of the first body 1, and the separation distance m between the guide wall 221 and the outlet grille 18 in the up-and-down direction may increase toward the outside in the radial direction of the first body 1.

The lower cover 22 may be convex downward. The guide wall 221 may be formed obliquely with respect to a radial direction of the second body 2. The guide wall 221 may be tilted with respect to the radial direction of the second body 2. The guide wall 221 may be inclined upward toward an end thereof. The guide wall 221 may extend upward as a distance from the center of the first body 1 increases.

The guide wall 221 may be a curved surface. For example, the guide wall 221 may be convex downward. A curvature of the guide wall 221 may increase toward a distal end thereof. Accordingly, a discharge air flow may be generated along the guide wall 221 up to an edge of the lower cover 22 by the Coanda effect.

An angle $\Theta3b$ between the guide wall 221 and the horizontal, radial direction of the first body 1 may be greater than zero. The angle $\Theta3b$ between the guide wall 221 and the radial direction of the first body 1 may be variable. The angle $\Theta3b$ between the guide wall 221 and the radial direction of the first body 1 may increase toward the edge of the guide wall 221.

The vane 181 may be elongated from the inside to outside of the first body 1. The vane 181 may be elongated outward from the central portion of the first body 1. The vane 181 may be elongated from a holder edge 194 to a housing edge 161. The vane 181 may be elongated from the housing edge 161 to the holder edge 194.

An angle between an extension direction of the guide wall 221 and the longitudinal direction of the vane 181 may be an acute angle. The longitudinal direction of the vane 181 may be a direction from the housing edge 161 to the holder edge 194, or from the holder edge 194 to the housing edge 161. The longitudinal direction of the vane 181 may be referred to as an extension direction of the vane 181. An extension direction of the guide wall 221 and the longitudinal direction of the vane 181 may be located on a same imaginary plane.

An angle $\Theta3a$ between the longitudinal direction of the vane 181 and the radial direction of the first body 1 may be greater than zero. The angle $\Theta3a$ between the longitudinal direction of the vane 181 and the radial direction of the first body 1 may be acute. The angle $\Theta3a$ between the longitudinal direction of the vane 181 and the radial direction of the first body 1 may be greater than the angle Θ3b between the guide wall 221 and the radial direction of the first body 1. A difference between the angle Θ3a, which is formed by the longitudinal direction of the vane 181 and the radial direction of the first body 1, and the angle Θ3b, which is formed by the guide wall 221 and the radial direction of the first body 1, may decrease toward the edge of the guide wall 221.

The outlet grille 18 may consist of a plurality of vanes 181. A cross-sectional shape of the outlet grille 18 may correspond to a cross-sectional shape of the first body 1. For example, the first body 1 may have a cylindrical shape, and the outlet grille 18 may have an annular shape corresponding to the first body 1.

The outlet grille 18 may be connected to the first body 1 and the second body 2. The outlet grille 18 may connect the upper housing 16 of the first body 1 and the lower cover 22 of the second body 2. The outlet grille 18 may be connected to an edge of the upper housing 16. The outlet grille 18 may be connected to one end of the lower cover 22.

The air cleaner 3 may include an inner body 15 disposed inside the upper housing 16. The inner body 15 may be disposed inside the upper housing 16, and may be connected to the edge of the upper housing 16. For example, an upper edge of the inner body 15 may be connected to an upper edge of the upper housing 16.

The inner body 15 may include an outlet passage 153. The inner body 15 may include an inner cover 152, which is an inner wall, and an inner housing 151, which is an outer wall. The outlet passage 153 may be defined by the inner cover 152 and the inner housing 151. The outlet passage 153 may be disposed between the inner cover 152 and the inner housing 151. For example, the inner body 15 may include a cylindrical inner cover 152, a cylindrical inner housing 151 having a greater diameter than the inner cover 152, and an annular outlet passage 153 formed between the inner cover 152 and the inner housing 151.

The inner cover 152 may be a portion of a holder (or mount) 19. The holder 19 may include the inner cover 152 and the upper housing 16. The holder 19 may include the outlet grille 18. For example, the holder 19 may include a holder base 192, the inner cover 152 that includes a portion of a holder wall 191, and the upper housing 16 that includes a remaining portion of the holder wall 191 and the holder edge 194.

The outlet grille 18 may be disposed at an end of the outlet passage 153. For example, the outlet grille 18 may be disposed at an end of the outlet passage 153 that is disposed at an upper part of the first body 1.

The first body 1 and the guide wall 221 of the second body 2 may be separable from each other. The first body 1 may include the holder 19 to be fixed to the second body 2. The post 21 of the second body 2 may be inserted into the holder 19.

The holder 19 may be recessed downward from the upper surface of the first body 1. The holder 19 may be open on one side in the first body 1. For example, the holder 19 may be open at the top of the first body 1.

The holder 19 may be disposed at the upper portion of the first body 1. The holder 19 may be formed on the upper surface of the first body 1. The holder 19 may be elevated from the upper surface of the first body 1. The holder wall 191 may be formed higher than the height of the first body 1. An upper end of the holder 19 may be disposed above the upper end of the circumferential wall of the first body 1. The upper end of the holder 19 may be a holder edge 194. For example, the holder edge 194 may be disposed above a housing edge 161.

The holder 19 may be disposed at a position substantially corresponding to the center of the first body 1. For example, the holder 19 may be formed in a cylindrical shape at an upper side of the first body 1, and may be disposed at a position corresponding to the center in the height direction of the first body 1.

The holder 19 may include the holder base 192 and the holder wall 191. The holder wall 191 may have a shape corresponding to the first body 1. The holder 19 may be smaller than the first body 1. For example, the holder 19 may be formed in a cylindrical shape corresponding to the first body 1 with a cylindrical shape to be smaller than the first body 1.

The vane 181 may be radially disposed between the holder 19 and the circumferential wall (e.g., upper housing 16) of the first body 1. The vane 181 may be connected to the holder 19. The vane 181 may be connected to the upper end of the holder 19. The upper end of the holder 19 may be the holder edge 194. One (upper and inner) end of the vane 181 may be connected to the upper end of the holder 19, and another (lower and outer) end of the vane 181 may be connected to the upper end of the circumferential wall of the first body 1. The one end (coupled to holder 19) and the other end of vane 181 (coupled to the circumferential wall of the first body) 1 may be opposite to each other.

The vane 181 may be connected to the holder edge 194 and the housing edge 161. Each of the plurality of vanes 181 may have one end connected to the holder edge 194 and another end connected to the housing edge 161. For example, the holder edge 194 may be formed higher than the housing edge 161, and the vane 181 may be obliquely connected from the upper holder edge 194 located at an upper position to the housing edge 161 located at a lower position.

The lower cover 22 may be connected to the holder edge 194. The lower cover 22 may extend from the holder edge 194. The guide wall 221 may extend from the holder edge 194 in the lateral direction. The outlet grille 18 and the guide wall 221 may be connected to form an acute angle at the holder edge 194. For example, the outlet grille 18 that is inclined downward toward the outside of the first body 1 and the guide wall 221 that is inclined upward toward the outside of the first body 1 may be connected at the holder edge 194, and may form an acute angle.

The second body 2 may include the post 21 that is inserted into the holder 19 of the first body 1. The post 21 may have a shape corresponding to that of the holder 19, and may be smaller than the opening defined by that holder 19. The post 21 of the second body 2 may be inserted into and fixed to the holder 19. The holder wall 191 may be in contact with an outer surface of the post 21. For example, the post 21 may be formed in cylindrical shape to be smaller than the holder 19 with a cylindrical shape so as to be fixed to the holder 19.

The vane 181 may be disposed between the post 21 and the circumferential wall of the first body 1. The vane 181 may be disposed between the holder 19 into which the post 21 is inserted and the circumferential wall of the first body 1. The upper end of the holder 19 may be positioned above the upper end of the circumferential wall of the first body 1. One end of the vane 181 adjacent to the post 21 may be disposed higher than another end of the vane 181. The other end may be opposite to the one end. For example, the plurality of vanes 181 arranged radially may each be configured such that one end thereof adjacent to the post 21 is disposed higher than another end thereof.

The holder 19 may include a guide column 193 to guide a coupling direction of the post 21. The guide column 193 may be disposed inside the holder 19. The guide column 193 may be formed on an inner wall of the holder 19. The guide column 193 may be provided in plurality. For example, a plurality of guide columns 193 may be in contact with the inner wall of the holder 19, and may be spaced apart from each other to be disposed at opposite positions.

The second body 2 may include a hook 28 to be detached from the first body 1. The hook 28 may be disposed inside the lower cover 22 adjacent to the post 21. The hook 28 may include a hook portion protruding to an outside of the post 21. The hook portion may be fitted into a corresponding engaging portion formed on the inner wall of the holder 19. The second body 2 may include a hook button 281 disposed at the guide wall 221 to operate the hook portion of the hook 28. The hook button 281 may be disposed to face the first body 1. The hook button 281 may be disposed to face the outlet grille 18.

The second body 2 may include the plate 24 with a flat surface. The second body 2 may include an upper plate 23 disposed between the lower cover 22 and the plate 24.

The indicator 26 may be disposed at the upper surface of the second body 2. The indicator 26 may face upward. The indicator 26 may be provided on the upper plate 23. The indicator 26 may protrude from the upper plate 23 toward the plate 24. The indicator 26 may be inserted into the slot 241 formed in the plate 24.

A substrate 264 may be disposed at a bottom of the indicator 26. The substrate 264 may allow the indicator 26 to be operated. The substrate 264 may be connected to a controller.

The indicator 26 may be disposed over a button module 25. The indicator 26 and the button module 25 may be arranged side by side in the up-and-down direction. The indicator 26 may visually output an indication of the operation of the button module 25.

The button module 25 may be disposed at the lower surface of the second body 2. The button module 25 may be disposed to face downward. The button module 25 may be disposed under the substrate 264. The button module 25 may be disposed at the lower cover 22. The button module 25 may define a section of the guide wall 221. The button module 25 may be disposed to correspond to a slope of the guide wall 221. For example, the guide wall 221 may be inclined upward toward the outside of the first body 1, and the button module 25 may be disposed at an angle corresponding to an inclined angle of an adjacent sections of the guide wall 221. Accordingly, a discharge air flow moving along the guide wall 221 may reach the button module 25, allowing a user to adjust the operation state of the air cleaner 3 while feeling the intensity of discharged air with his or her hand.

The button module 25 may be connected to the substrate 264. The button module 25 may be connected to a controller. The button module 25 may be connected to the indicator 26. The button module 25 may change the operation state of the air cleaner 3. For example, when the user presses the button module 25, the operation of the air cleaner 3 (e.g., of a blower motor 14 in FIG. 7) may start or stop.

The button module 25 may be disposed adjacent to a circumferential end of the second body 2. The button module 25 may be disposed closer to the outer circumferential end of the second body 2 than the central post 21 of the second body 2. The button module 25 may be located further outward relative to the circumferential wall of the first body 1. For example, the button module 25 may be disposed adjacent to a circumferential end of the lower cover 22 to be easily reached by the user. Accordingly, the user may easily access the button module 25 even when it is positioned on an underside of second body 2 and hidden from view.

The button module 25 may be disposed below the indicator 26. The substrate 264 may be disposed between the button module 25 and the indicator 26. The button module 25, the substrate 264, and the indicator 26 may be disposed side by side in the up-and-down direction. For example, the substrate 264 may be disposed under the indicator 26, and the button module 25 may be disposed under the substrate 264. Accordingly, the indicator 26 disposed at the top surface of plate 24 may allow the user to easily determine the position of the button module 25, which is hidden from view. Thus, an additional member connecting the button module 25 and the substrate 264 may not be required to operate the indicator 26. This may result in reducing the number of parts and achieving a simple structure.

The charging pad 271 may be provided on the upper plate 23. The charging pad 271 may protrude from the upper plate 23 toward the plate 24. The charging pad 271 may be inserted into the pad hole 242 formed in the plate 24. A charging coil 272 may be disposed under the charging pad 271. The charging coil 272 may be disposed between the lower cover 22 and the upper plate 23. A charging substrate 273 may be adjacent to the charging coil 272, and may be disposed under the upper plate 23.

A water collection channel may be formed in the upper plate 23. The water collection channel may be formed under the plate 24. The water collection channel may be formed between the plate 24 and the upper plate 23. The water collection channel may be formed by being recessed from the upper plate 23. The water collection channel may include a main water collection channel 231. The main water collection channel 231 may be disposed adjacent to a central portion of the upper plate 23.

The water collection channel may include a slot water collection channel 232. The slot water collection channel 232 may be formed along a circumference of the indicator 26. The slot water collection channel 232 may be disposed under the slot 241 formed in the plate 24. The slot water collection channel 232 may be disposed under an edge of the slot 241. Accordingly, liquid penetrated into a gap between the slot of the plate and the indicator may be collected in the slot water collection channel.

The water collection channel may include a pad water collection channel 233. The pad water collection channel 233 may be formed along a circumference of the charging pad 271. The pad water collection channel 233 may be disposed under the pad hole 242 formed in the plate 24. The pad water collection channel 233 may be disposed under an edge of the pad hole 242. The pad water collection channel 233 may be formed along a portion of the circumference of the charging pad 271.

Figure 4:
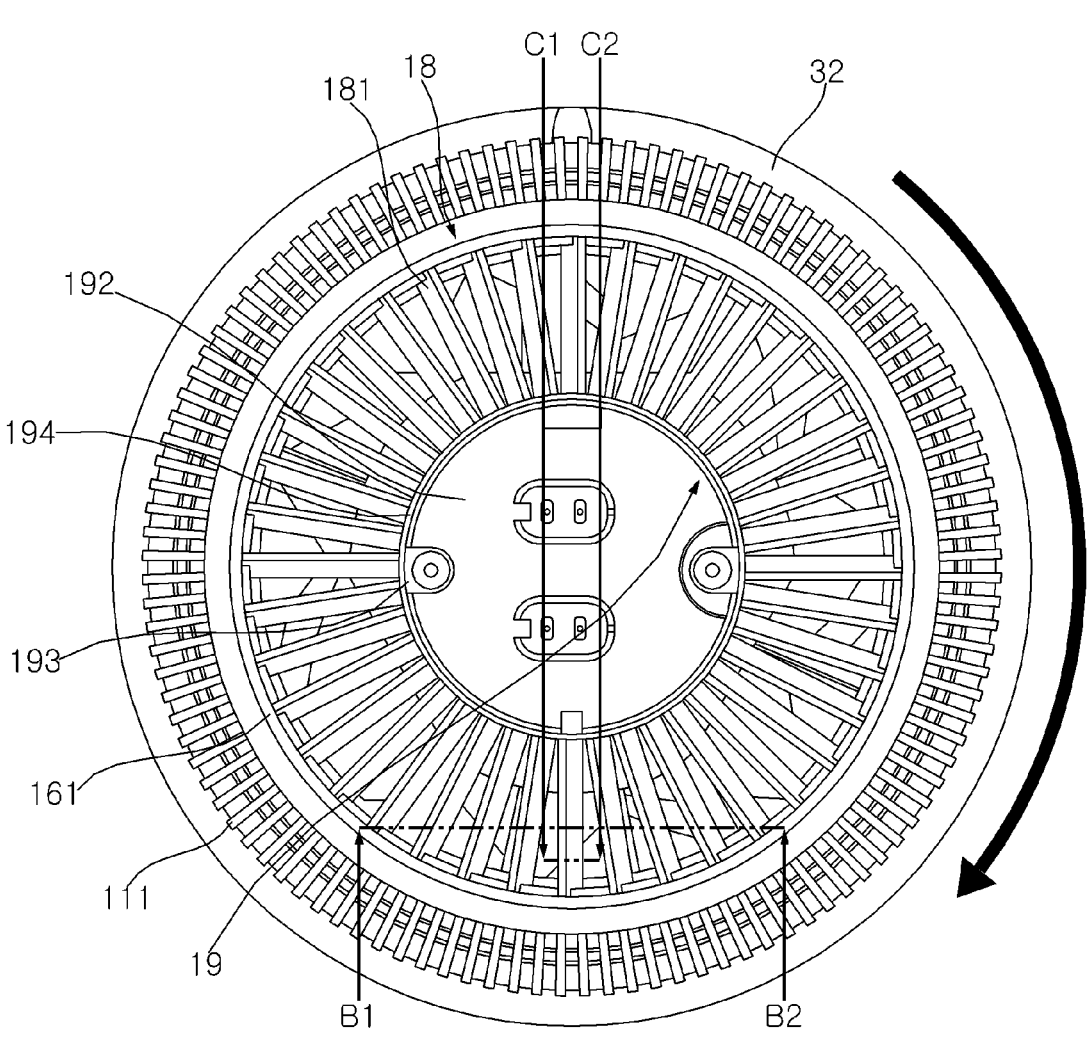
FIG. 4 is a top plan view of a first body according to an embodiment of the present disclosure.

Referring to FIG. 4, a top view of the first body 1 will be described below. The holder 19 may be disposed at an upper side or part of the first body 1. The holder 19 may face upward. The second body 2 may be coupled to the holder 19. The holder 19 may be formed by being recessed to a predetermined depth. The holder 19 may be disposed at a position corresponding to the center of the first body 1. For example, the holder 19 may be disposed at a position corresponding to the central portion of the first body 1, and may extend downward and away from the outside of the first body 1 to be recessed to a predetermined depth.

The holder 19 may have a cylindrical shaped opening. A transverse section of the holder 19 may have a shape corresponding to a transverse section of the post 21. For example, the holder 19 may have a cylindrical shape with a circular transverse section.

The holder 19 may include the holder base 192 facing upward. The holder base 192 may have a shape corresponding to the shape of a transverse section of the first body 1. The holder base 192 may have the shape of the transverse section of the holder 192. For example, the holder 19 may have a cylindrical shape, and the holder base 192 may have a circular shape.

The holder 19 may include the guide column (or guide protrusions) 193. The guide column 193 may guide an insertion direction of the post 19 of the second body 2. The guide column 193 may be provided on the inner wall of the holder 19. The guide column 193 may be provided in plurality. For example, the guide column 193 may be provided on the inner wall of the holder 19, and two guide columns 193 may be spaced apart from each other to be disposed at opposite positions.

The holder edge 194 may be positioned at an upper end of the holder 19. For example, the holder edge 194 may define an upper edge of the holder 19.

The outlet 17 (see FIG. 3) may open at the top, such as under grille 18. The outlet 17 may have a circular shape. The outlet 17 may be formed at the outlet grille 18.

The outlet grille 18 may define the upper portion of the first body 1. The outlet grille 18 may be disposed at the top of the first body 1. The outlet grille 18 may have a circular shape. The outlet grille 18 may be formed around the holder 19. The holder 19 may be disposed at a central portion of the outlet grille 18, and the outlet grille 18 may have an annular shape. The outlet grille 18 may be connected to the holder edge 194 and the housing edge 161. For example, the outlet grille 18 may be provided at its central portion with the holder 19, and may extend from the holder edge 194 of the holder 19 to the outside of the first body 1, so as to be connected to the housing edge 161. Here, the outlet grille 18 may have an annular shape.

The outlet grille 18 may include a plurality of vanes 181. The outlet grille 18 may be configured as a plurality of vanes 181. The plurality of vanes 181 may be disposed parallel to each other at the outlet 17, such as to be separated from each other. Each of the plurality of vanes 181 may be disposed at a distal end of the outlet passage 153. The plurality of vanes 181 may be disposed radially. For example, the outlet grille 18 may have an annular shape in which the holder 19 is disposed at the central portion thereof, and the plurality of vanes 181 may be radially disposed with respect to an imaginary center of the outlet grille 18.

A width of the outlet grille 18 may be less than a width of the base 32 (see FIG. 1). The width of the outlet grille 18 may be less than the width of the first body 1 (see FIG. 1). For example, the first body 1 may have a shape that is narrow at the top and wide at the bottom, and the outlet grille 18 may be disposed on the upper portion of the first body 1, and may be positioned at a height where the width of the first body 1 is the narrowest.

The plurality of vanes 181 may be disposed at the outlet 17. Each of the plurality of vanes 181 may be disposed parallel to a longitudinal direction, such as the height direction of the first body 1. Each of the plurality of vanes 181 may be inclined in a transverse direction with respect to the height direction of the first body 1, namely, in the radial direction of the first body 1. Each of the plurality of vanes 181 may be disposed along a circumference of the outlet 17, and may be inclined in a circumferential direction of the outlet 17. For example, the plurality of vanes 181 may be disposed obliquely along a circumference of an annular outlet 17 in a clockwise direction.

The outlet 17 may face upward. The outlet 17 may be formed obliquely upward in the lateral direction. The outlet 17 may be formed obliquely upward in the radial direction. For example, the outlet grille 18 with an annular shape may include a plurality of vanes 181 disposed radially, and the plurality of vanes 181 may each be inclined in a clockwise direction along the circumference of the outlet 17.

Air discharged from the outlet 17 may generate an upward air flow. Air discharged from the outlet 17 may be directed upward, and may be discharged obliquely to the lateral direction. For example, a plurality of vanes 181 inclined in a clockwise direction may be radially arranged at the outlet 17 with an annular outlet 17, and air, which is discharged from the outlet 17, may be discharged, through the vanes 181, by rotating upward in a spiral shape in the clockwise direction. Accordingly, loss caused by discharged air colliding with the guide wall 221 of the second body 2 may be minimized. Thus, the efficiency of the air cleaner 3 may be improved.

Figure 5:
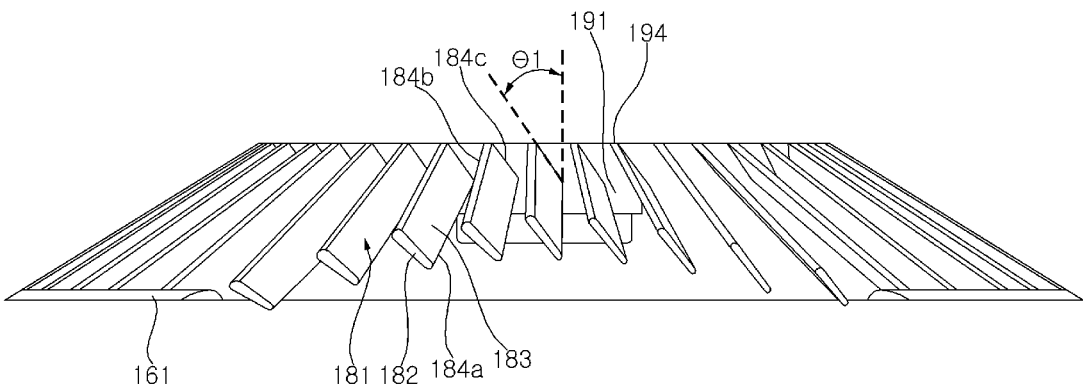
FIG. 5 is an elevational cross-sectional view of an outlet grille, taken along a line B1-B2 of FIG. 4.

The outlet grille 18 will be described with reference to FIG. 5. FIG. 5 is an elevational cross-sectional view of the outlet grille 18, taken along a line B1-B2 of FIG. 4.

The outlet grille 18 may extend in the height direction of the first body 1. The outlet grille 18 may be formed obliquely in the height direction of the first body 1. The outlet grille 18 may be inclined in the height direction of the first body 1. For example, the outlet grille 18 may be inclined upward toward the center of the first body 1. For example, the outlet grille 18 may be inclined downward toward the outside of the first body 1. For example, the outlet grille 18 may have the shape of a cone with the top cut off, namely, a truncated cone shape.

The holder 19 (see FIG. 4) may be elevated relative to the housing edge 161. The holder edge 194 of the holder 19 may be elevated. A height of the holder edge 194 may be greater than a height of the housing edge 161 of the first body 1. The outlet grille 18 may be connected to the holder edge 194 and the housing edge 161. For example, the outlet grille 18 may be connected from the holder edge 194 to the housing edge 161 located at a lower position so as to be formed in an inclined manner.

The vane 181 may be disposed obliquely in the longitudinal direction. One end of the vane 181 may be located higher than another end thereof. An inner end of the vane 181 connected to the holder edge 194 may be located higher than an outer end of the vane 181 connected to the housing edge 161. The vane 181 may be inclined upward toward the outside of the first body 1. The vane 181 may be disposed to be inclined at a predetermined angle $\Theta 3a$ with respect to the radial direction of the first body 1. For example, the vane 181 may be inclined at the predetermined angle $\Theta 3a$ with respect to the radial direction of the first body 1, so that a plurality of vanes 181 are radially arranged with spacing therebetween.

The vane 181 may be disposed obliquely in the radial direction. The vane 181 may be inclined in the radial direction. The vane 181 may be obliquely connected to the holder wall 191. The vane 181 may be inclined at a predetermined angle $\Theta 1$ in the lateral direction with respect to a height direction of the holder wall 191. For example, the vane 181 may be connected to the holder wall 191 and the housing edge 161, and may be inclined in a clockwise direction with respect to the holder wall 191. Here, air that is discharged from the outlet 17 may be emitted upward in the clockwise direction.

The vane 181 inclined in a circumferential direction may include a positive pressure surface 182, which is a surface in the direction of air flow. The positive pressure surface 182 may face the lateral direction. The positive pressure surface 182 may face downward. For example, an air flow may flow from the lower part to the upper part of the first body 1, and the positive pressure surface 182 of the vane 181 inclined in a clockwise direction may face downward in the clockwise direction.

The vane 181 inclined in the circumferential direction may include a negative pressure surface 183 that is opposite to the positive pressure surface 182. The negative pressure surface 183 may be a surface in a direction opposite to the positive pressure surface 182. The negative pressure surface 183 may face upward. The negative pressure surface 183 may face the lateral direction. For example, as an air flow moves from the lower part to the upper part of the first body 1, the negative pressure surface 182 of the vane 181 inclined in a clockwise direction may face upward in the clockwise direction.

When the vane 181 is disposed to be inclined in the lateral direction with respect to a height direction of the holder 19, the predetermined angle Θ1 inclined with respect to the holder 19 may be based on the negative pressure surface 183.

The vane 181 may include a front end 184a. The front end 184a is a lower end of the vane 181 on an upstream side in an air flow direction. The front end 184a may be disposed at a bottom of the vane 181. For example, an air flow may be generated from the lower part to the upper part of the first body 1, and the front end 184a may face a downward direction of the first body 1.

The front end 184a may be inclined in the lateral direction. The front end 184a may be inclined in the circumferential direction of the outlet 17. The front end 184a may face the circumferential direction. For example, the front end 184a of the vane 181 inclined in a clockwise direction may face downward in a counterclockwise direction.

The vane 181 may include a rear end 184b. The rear end 184b may be an upper end of the vane 184 on a downstream side of the air flow direction. The rear end 184b may be disposed at a top of the vane 181. For example, an air flow may be generated from the lower part to the upper part of the first body 1, and the rear end 184b may face an upward direction of the first body 1.

The rear end 184b may be inclined in the lateral direction. The rear end 184b may be inclined in the circumferential direction. The rear end 184b may face the circumferential direction. For example, the rear end 184b of the vane 181 inclined in a clockwise direction may face upward in the clockwise direction.

Figure 6:
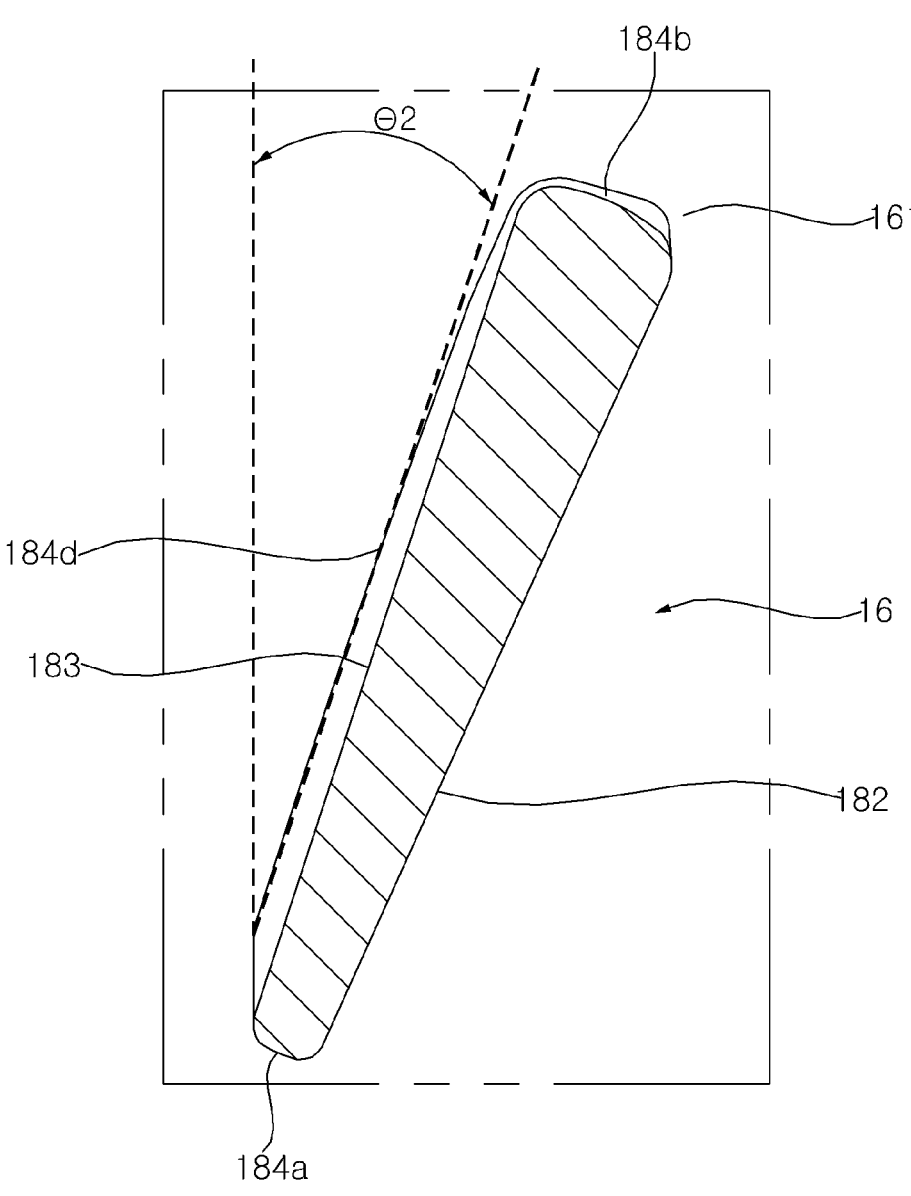
FIG. 6 is a cross-sectional view of a vane, taken along a line C1-C2 of FIG. 4.

The vane 181 will be described with reference to FIG. 6. FIG. 6 is a cross-sectional view of the vane 181, taken along a line C1-C2 of FIG. 4.

The vane 181 may be connected to the upper housing 16. The vane 181 may be inclined at a predetermined angle Θ2 with respect to the height direction of the first body 1. The vane 181 may be inclined at a predetermined angle Θ2 with respect to a height direction of the upper housing 16. The predetermined angle Θ2 may be based on the negative pressure surface 183 of the vane 181. For example, the vane 181 may be inclined such that the negative pressure surface 183 forms the predetermined angle Θ2 with respect to the height direction of the upper housing 16.

One end of the vane 181 may be connected to the holder edge 194, and another end of the vane 181 may be connected to the housing edge 161. The vane 181 may be connected to the holder wall 191 to be inclined at a first angle Θ1 with respect to the height direction of the first body 1, and may be connected to the upper housing 16 to be inclined at a second angle Θ2. The vane 181 may be connected to the holder edge 194 to be inclined at a first angle Θ1 with respect to the height direction of the first body 1, and may be connected to the housing edge 161 to be inclined at a second angle Θ2.

The first angle Θ1 and the second angle Θ2 may be different from each other. The vane 181 may have a twisted shape. The positive pressure surface 182 and the negative pressure surface 183 of the vane 181 may be curved surfaces.

A width of the front end 184a and a width of the rear end 184b may be different from each other. For example, the vane 181 may gradually increase in width from the front end 184a to the rear end 184b.

Figure 7:
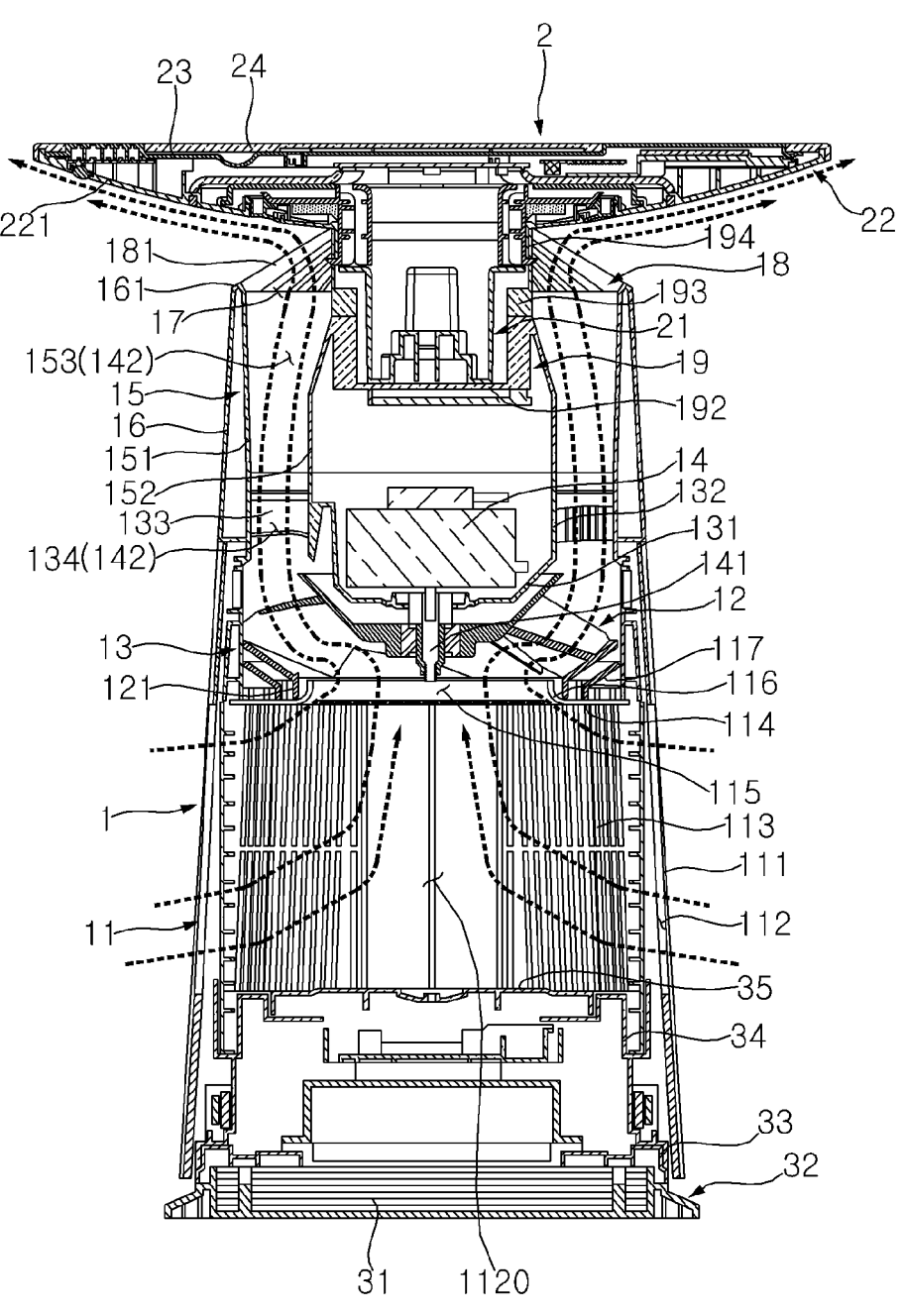
FIG. 7 is a cross-sectional view of an air cleaner taken along a line A1-A2 of FIG. 1.
Figure 8:
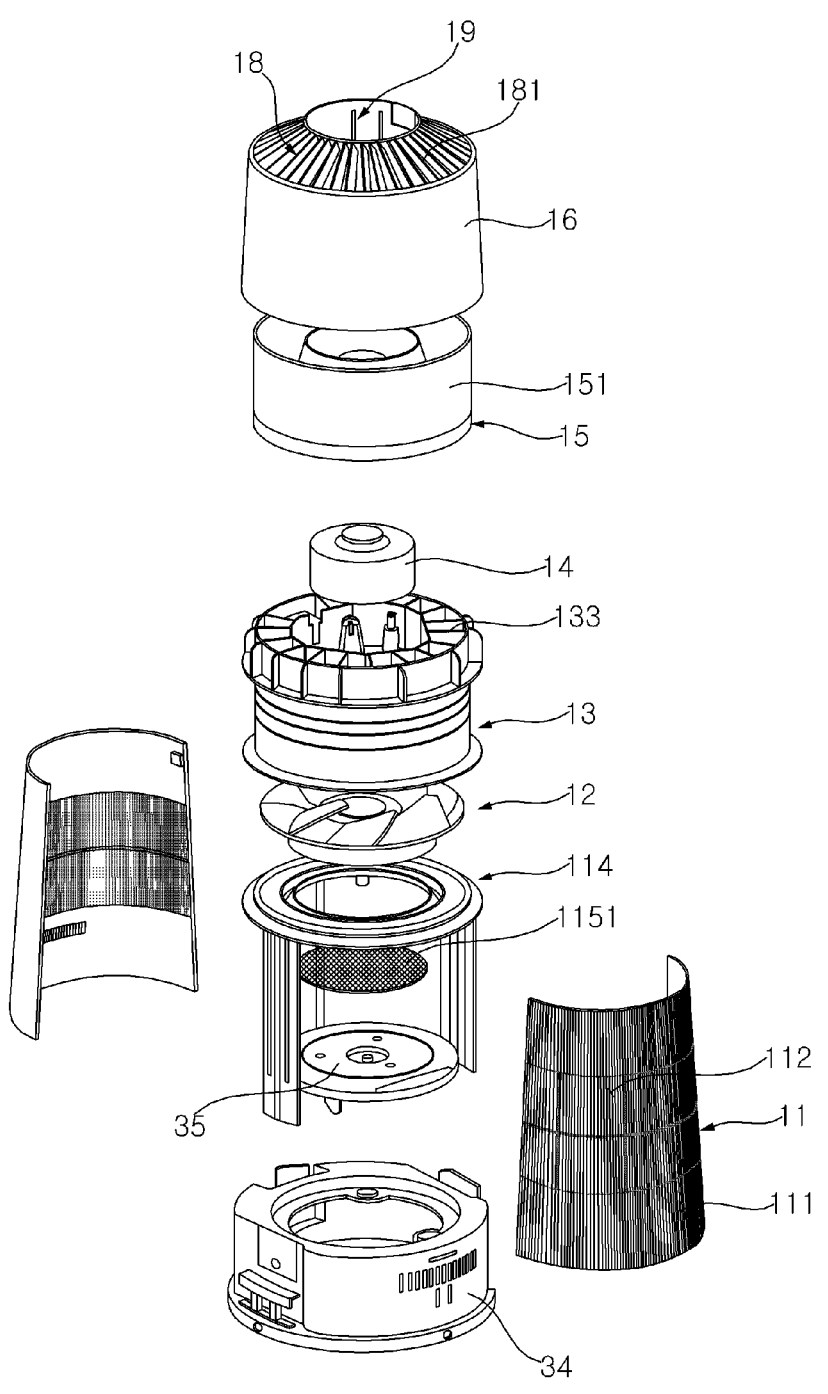
FIG. 8 is an exploded perspective view of a first body according to an embodiment of the present disclosure.

Hereinafter, aspects of the air cleaner 3 will be described with reference to FIGS. 7 and 8. An air cleaner 3 may include a base 32 to support the first body 1.

The air cleaner 3 may include a weight disposed at a lower portion thereof. The weight may be disposed inside the first body 1. The weight may be disposed below an inlet 112. The weight may be disposed between the base 32 and the inlet 112. The weight may be disposed inside the base 32. For example, the weight may be coupled to the base 32 so as to be disposed at the lower portion of the air cleaner 3. The weight may be a weight plate 31. A plurality of weight plates 31 may be stacked.

The first body 1 may include a lower housing 11. The air cleaner 3 may include a bottom housing 34 that is disposed inside the first body 1 and a bottom cover 35 that covers the bottom housing 34. An electric control unit may be disposed inside the bottom housing 34. For example, the electric control unit may be disposed inside the bottom housing 34, and the bottom housing 34 may be covered by the bottom cover 35.

The air cleaner 3 may include a filter 113. The filter 113 may be disposed inside the first body 1. The filter 113 may be disposed inside the lower housing 11. The filter 113 may face the inlet 112 formed at the first body 1. Air toward the inlet 112 may pass through the filter 113 to be introduced into the first body 1.

The filter 113 may have a shape corresponding to an inside of the first body 1. For example, the filter 113 may have a cylindrical shape corresponding to the first body 1 with a cylindrical shape. The filter 113 may face an inner wall of the first body 1. The filter 113 may face an inner wall of the lower housing 11.

An inlet passage 1120 may be formed inside the filter 113. The inlet passage 1120 may communicate with the inlet 112. Air toward the inlet 112 may pass through the filter 113 to be introduced into the inlet passage 1120. The inlet passage 1120 may be formed in the first body 1. The inlet passage 1120 may be formed in the lower housing 16. Air introduced into the inlet passage 1120 through the inlet 112 may be moved to an upper portion of the first body 1 by a blower fan 12.

The air cleaner 3 may include an orifice 114 disposed inside the first body 1. The orifice 114 may face the blower fan 12. The orifice 114 may face the inlet passage 1120. One surface of the orifice 114 may face the blower fan 12, and another surface of the orifice 114 may face the inlet passage 1120. For example, one surface of the orifice 114 may face the blower fan 12, and another surface of the orifice 114 opposite to the one surface may face the inlet passage 1120.

The orifice 114 may include an intake 115. Air introduced into the inlet passage 1120 may pass through the intake 115 of the orifice 114 and then flow toward the blower fan 12. The intake 115 may have a circular shape.

The orifice 114 may include an intake guide 116 formed such that an edge thereof that defines the intake 115 is bent upward. The intake guide 116 may be bent toward the blower fan 12 side. Air introduced into the inlet passage 1120 may be moved to the blower fan 12 via the intake guide 116 without loss. For example, the intake guide 116 may be formed such that an inner edge of the orifice 114 that defines the intake 115 is bent upward.

The blower fan 12 may face the intake 115. The blower fan 12 may be disposed on top of the intake 115. The blower fan 12 may be disposed between a vertical passage 142 and the inlet passage 1120. The blower fan 12 may partition the vertical passage 142 and the inlet passage 1120. The blower fan 12 may partition or separate a blowing passage 134 from the inlet passage 1120.

The blower fan 12 may cause air introduced into the inlet passage 1120 through the inlet 112 to move to the outlet 17. The vertical passage 142 may be disposed between the inlet passage 1120 and the outlet 17. The vertical passage 142 may include the blowing passage 134 and an outlet passage 153.

The vertical passage 142 may be defined by a cover and a housing. The cover may include an inner cover 152 and a motor cover 132. The cover may further include an inclined cover 131. The cover may extend downward from a holder 19. The cover may be provided therein with a blower motor 14. The cover may be provided, on a lower side thereof, with the blower fan 12. A diameter of an outer circumferential end of the cover may increase downward. The diameter of the outer circumferential end of the cover may decrease upward. A width of the cover may decrease upward. The cover may be a curved surface whose curvature increases upward. The cover may be convex in a radial direction. A gap between the cover and an outer wall of the first body 1 may increase upward. Accordingly, an air flow moving to the outlet may flow along the cover by the Coanda effect so as to be guided to the second body.

The housing may include an upper housing 16. The housing may be disposed between the outer wall of the first body 1 and the cover. A width of the housing may increase upward. A gap between the housing and the cover may increase toward the top.

The blower motor 14 may allow the blower fan 12 to rotate. A shaft 141 may connect the blower motor 14 and the blower fan 12. For example, the blower fan 12 may be connected to the blower motor 14 that is located at an upper position by the shaft 141, and rotation of the blower fan 12 may cause an air flow to be generated from the lower portion to the upper portion of the first body 1.

The blower motor 14 may be configured to rotate the blower fan 12 in a circumferential direction. For example, the blower motor 14 may rotate the blower fan 12 in a clockwise direction, and air blown from the inlet passage 1120 through the intake 115 may be moved to the blowing passage 134 located at an upper position by the blower fan 12.

The orifice 114 may include a flow guide 117 disposed to be spaced downward from the blower fan 12. The flow guide 117 may be formed in an inclined manner. The flow guide 117 may be inclined in a direction corresponding to an inclined direction of the shroud 124 of the blower fan 12. For example, the shroud 124 of the blower fan 12 may be inclined upward toward the outside of the blower fan 12, and the flow guide 117 may be inclined in a direction corresponding to the inclined direction of the shroud 124. The flow guide 117 may guide air leaked through a gap between the intake guide 116 and the inlet guide 121 to move upward. The flow guide 117 may prevent loss of air directed from the inlet passage 1120 to the blowing passage 134. The flow guide 117 may prevent the formation of an eddy current in the first body 1.

The inlet guide 121 of the blower fan 12 may cover the intake guide 116. The inlet guide 121 may be formed larger (e.g., to extend further in a radial inward direction from lower housing 11) than the intake guide 116. For example, the intake guide 116 may have a cylindrical shape, and the inlet guide 121 may have a cylindrical shape to be larger than the intake guide 161 so as to cover a side surface of the intake guide 161.

The air cleaner 3 may include an inner body 15 disposed inside the upper housing 16 and defining the outlet passage 153. The inner body 15 may include an inner housing 151 that defines an outer wall and the inner cover 152 that extends from the motor cover 132 in a height direction of the inner body 15. The inner housing 151 may be connected to the upper housing 16 at the housing edge 161. The inner cover 152 may be connected to the motor cover 132 at the holder wall 191. The inner housing 151 may have a substantially cylindrical shape. The inner cover 152 may have a shape substantially corresponding to the inner housing 16. For example, the inner cover 152 may have a substantially cylindrical shape that is similar to but smaller than the substantially cylinder shape of the inner housing 151.

The outlet passage 153 may be defined by the inner housing 151 and the inner cover 152. The outlet passage 153 may extend in an up-and-down or vertical direction. The outlet passage 153 may connect the outlet 17 and the blowing passage 134. Air introduced from the blowing passage 134 may be discharged to the outlet 17 through outlet passage 153.

The inner cover 152 may be configured as a curved surface. The inner cover 152 may have a substantially cylindrical shape that becomes narrower in the air flow direction. A width between the inner housing 151 and the inner cover 152 may gradually increase in the air flow direction. The outlet passage 153 may become gradually wider in the air flow direction. For example, air may flow from the bottom to the top, and the inner cover 152 may have a substantially cylindrical shape with a curved outer wall that decreases in width toward the top, and the outlet passage 153 formed between the inner cover 152 and the inner housing 151 may increase in width toward the top. Flowing air may move upward along the curved inner cover 152 due to the Coanda effect.

The outlet 17 may be positioned at a top of the inner body 15. The outlet 17 may be disposed at a distal end of the outlet passage 153 inside the inner body 15. The outlet 17 may be formed at the outlet grille 18. The outlet 17 may be formed between the plurality of vanes 181 of the outlet grille 18.

The second body 2 may be disposed over the first body 1. The second body 2 may include a guide wall 221. The guide wall 221 may extend in at least a lateral direction. The guide wall 221 may be curved. The guide wall 221 may be configured as a curved surface. The guide wall 221 may have the shape that is convex downward. For example, the guide wall 221 may be a curved surface that is curved upward toward an end of the second body 2.

The degree of bending of the guide wall 221 may increase toward an end thereof. A curvature of the guide wall 221 may increase toward the end thereof. Accordingly, the Coanda effect of air flowing along the guide wall 221 may be increased.

The outlet 17 may face the second body 2. The outlet 17 may face the guide wall 221. Air discharged from the outlet 17 may flow along the guide wall 221. The guide wall 221 may guide air discharged from the outlet 17. The guide wall 221 may control a direction of discharged air.

The second body 2 may include a lower cover 22 having the guide wall 221, and the lower cover 22 may define the outer appearance of a lower surface of a table. The second body 2 may include a plate 24 that is disposed over the lower cover 22 and defines a top or upper surface thereof, and the upper surface may be a substantially flat surface.

Figure 9:
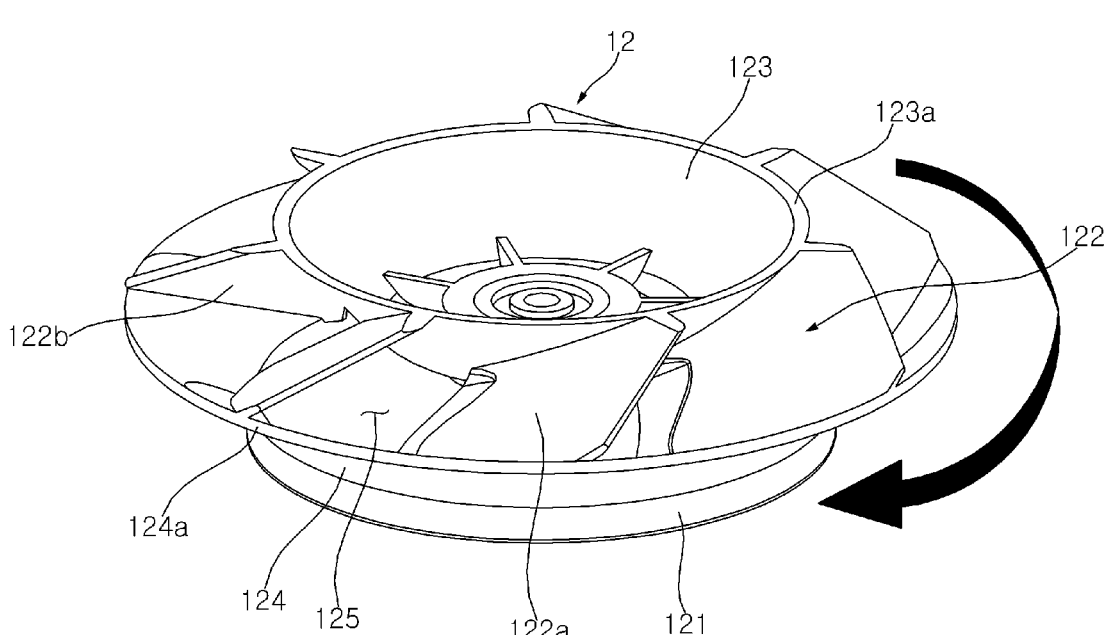
FIG. 9 is a perspective view of a blower fan according to an embodiment of the present disclosure.

Referring to FIG. 9, the blower fan 12 will be described below. The blower fan 12 may be disposed inside the first body 1. The blower fan 12 may rotate in a circumferential direction of the first body 1. The blower fan 12 may rotate in the circumferential direction. For example, the blower fan 12 may rotate in a clockwise direction.

The air cleaner 3 may include a blower housing 13 disposed inside the first body 1. The blower fan 12 may be disposed inside the blower housing 13. The blower motor 14 may be disposed inside the blower housing 13. For example, the blower fan 12 may be disposed at a lower portion of the blower housing 13, and the blower motor 14 may be disposed at an upper portion of the blower housing 13.

The blower fan 12 may include a hub 123 having a center to which a rotating shaft of the blower motor 14 is coupled. The hub 123 may be concavely formed toward the bottom. For example, the hub 123 may be concave downward, and a hub edge 123a may be circular. A lower portion of the motor cover 132 may be inserted into an upper portion of the hub 123, so that at least a portion of the blower motor 14 is disposed in the hub 123.

The shaft 141 (see FIG. 7) of the blower motor 14 that is disposed on the hub 123 may be coupled to the center of the hub 123. The hub 123 may be disposed to be spaced upward from a shroud 124. A plurality of blades 122 may be coupled to a lower surface of the hub 123.

The blower fan 12 may include the shroud 124 spaced apart from the hub 123 and provided, at a central portion thereof, with a blowing hole 125 in which air is drawn. The shroud 124 may have a shape corresponding to that of the hub 123. For example, the hub 123 may have a circular hub edge 123a and be concave downward, and the shroud 124 may have a circular shroud edge 124a, be concave downward, and may be larger than the hub 123.

The blower fan 12 may include a plurality of the blades 122 disposed between the hub 123 and the shroud 124. The blade 122 may connect the hub 123 and the shroud 124. An upper end of the blade 122 may be coupled to the lower surface of the hub 123, and a lower end of the blade 122 may be coupled to an upper surface of the shroud 124. The plurality of blades 122 may be spaced apart from each other in the circumferential direction.

The blade 122 may have a flat surface. The blade 122 may be disposed to be inclined between the hub 123 and the shroud 124. The blade 122 may be inclined in a direction opposite to a rotation direction of the blower fan 12. For example, the blower fan 12 may rotate in a clockwise direction, and the blade 122 may be disposed between the hub 123 and the shroud 124 to be inclined in a counterclockwise direction with respect to a height direction of the blower fan 12. Here, a negative pressure surface 122a of the blade 122 may face upward in the clockwise direction.

The blower fan 12 may include an inlet guide 121 extending downward from the shroud 124. The inlet guide 121 may face the intake 115. Air blown from the intake 115 may pass through the inlet guide 121, and may flow to the blowing hole 125 formed between the hub 123 and the shroud 124. The inlet guide 121 may prevent loss of air directed from the intake 115 to the blowing hole 125.

Figure 10:
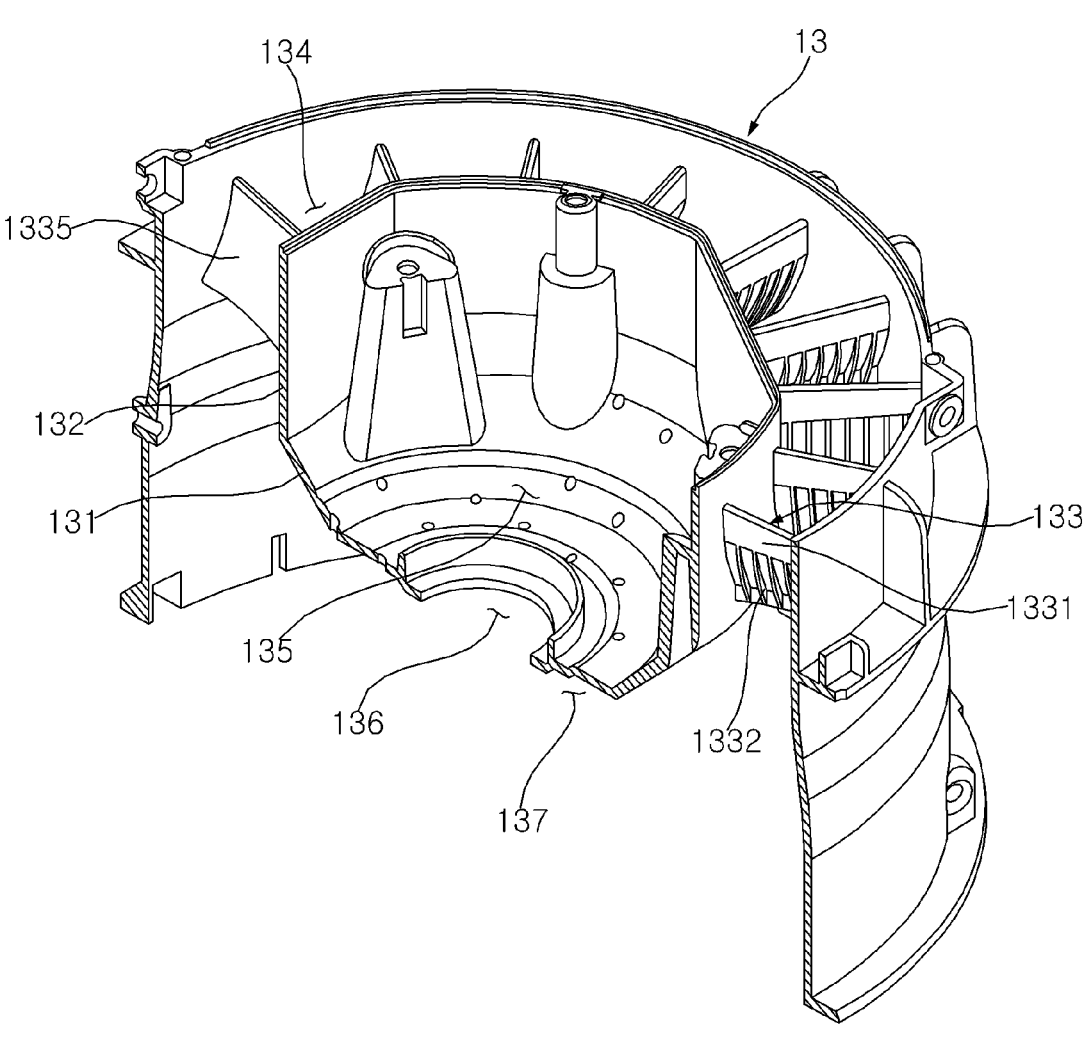
FIG. 10 is a cross-sectional perspective view of a blower housing according to an embodiment of the present disclosure.

Referring to FIG. 10, the blower housing 13 will be described below. The blower housing 13 may include the motor cover 132 at which the blower motor 14 is disposed. The motor cover 132 may partition a motor installation portion 135 where the blower motor 14 is disposed. The blower fan 12 may be disposed outside the motor cover 132, and the blower motor 14 may be disposed inside the motor cover 132.

The motor cover 132 may be provided with a through-hole 136 through which the shaft 141 that connects the blower motor 14 and the blower fan 12 passes. The blower motor 14 disposed inside the motor cover 132, and the blower fan 12 disposed outside the motor cover 132 may be connected by the shaft 141 that passes through the through-hole 136.

The blower housing 13 may include the inclined cover 131 provided at a lower portion of the motor cover 132. The inclined cover 131 may be disposed to be inclined upward toward an outside of the blower housing 13. The inclined cover 131 may be inclined downward toward an inside of the blower housing 13. A slope of the inclined cover 131 may correspond to a slope of the blower fan 12. For example, the slope of the inclined cover 131 may correspond to an inclined direction of the shroud 124 of the blower fan 12.

The blower housing 13 may include the motor cover 132 and the blowing passage 134 defined by an outer wall of the blower housing 13. Air flowing from the bottom to the top via the blower fan 12 may pass through the blowing passage 134. The blowing passage 134 may have an annular shape. For example, the blowing passage 134 may be an annular passage formed between the outer wall of the blower housing 13 and the motor cover 132 disposed inside the blower housing 13.

The blower housing 13 may include a guide vane 133 disposed between the motor cover 132 and the outer wall of the blower housing 13. The guide vane 133 may be provided in plurality radially arranged along a periphery of the motor cover 132 with spacing therebetween. The guide vane 133 may guide air blown in a spiral shape from the blower fan 12 located at a lower position to flow linearly upward.

The guide vane 133 may be disposed to be tilted with respect to a height direction of the blower housing 13. The guide vane 133 may be disposed to be inclined in a direction opposite to an inclined direction of the blade 122 of the blower fan 12. For example, the blade 122 of the blower fan 12 may be disposed to be inclined upward in a counterclockwise direction, and the guide vane 133 may be disposed to be inclined upward in a clockwise direction. The guide vane 133 may be disposed such that the blowing passage 134 is formed in a direction corresponding to a direction of air blown from the blower fan 12. For example, air blown out from the blower fan 12 may be blown upward toward a clockwise direction, and the guide vane 133 may be disposed to be tilted upward in the clockwise direction, allowing the blowing passage 134 to face upward in the clockwise direction.

Figure 11:
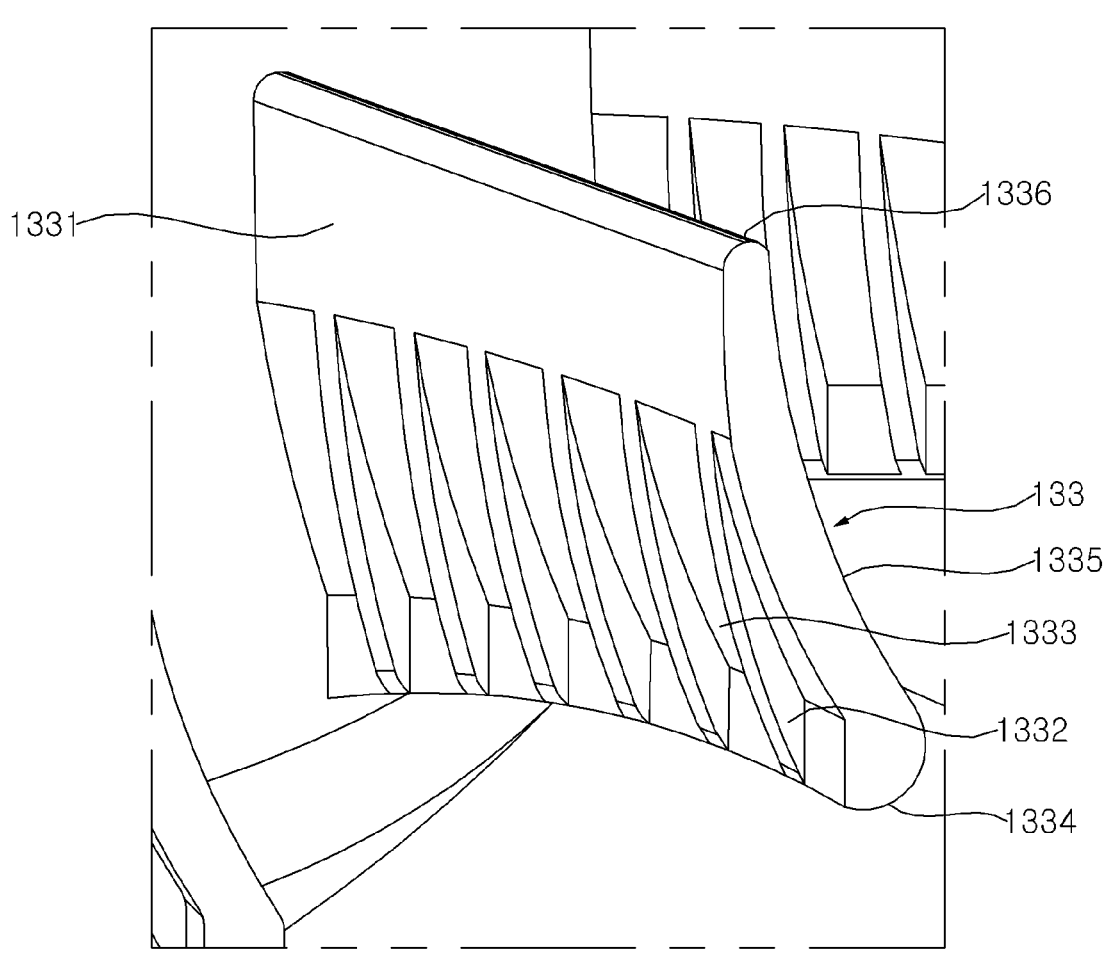
FIG. 11 is an enlarged view of a guide vane according to an embodiment of the present disclosure.

Referring to FIG. 11, the guide vane 133 will be described below. The guide vane 133 may include a positive pressure surface 1331, which is a surface facing a direction from which air is blown, and a negative pressure surface 1335, which is a surface in a direction opposite to the positive pressure surface 1331. The guide vane 133 may be tilted, the positive pressure surface 1331 may face downward, and the negative pressure surface 1335 may face upward. For example, the guide vane 133 may be inclined upward in a clockwise direction, the positive pressure surface 1331 may face downward in the clockwise direction, and the negative pressure surface 1335 may face upward in a counterclockwise direction.

The guide vane 133 may have the shape of a plate. The guide vane 133 may be a curved surface. The positive pressure surface 1331 of the guide vane 133 may be convex, and the negative pressure surface 1335 may be concave. The guide vane 133 may be bent such that a rear end 1336 thereof faces upward. For example, the guide vane 133 may be bent such that a front end 1334 thereof faces downward in a counterclockwise direction and a rear end 1336 thereof faces upward. Here, the positive pressure surface 1331 may be formed in a convex manner, and the negative pressure surface 1335 may be formed in a concave manner.

A plurality of ribs 1332 may be formed on at least a portion of the positive pressure surface 1331 of the guide vane 133. For example, the plurality of ribs 1332 may extend upward from a bottom of the positive pressure surface 1331 so as to be provided on a portion of the positive pressure surface 1331, and a remaining portion of the positive pressure surface 1331 may be configured as a flat surface.

A guide groove 1333 may be formed between the plurality of ribs 1332 of the positive pressure surface 1331. The rib 1332 may be formed in a direction corresponding to an air flow direction. For example, air may flow from the bottom to the top, and the rib 1332 may be formed vertically. Here, the guide groove 1333 may be vertically formed between the plurality ribs 1332.

The guide vane 133 may include the front end 1334 and the rear end 1336. The front end 1334 may face an upstream side in the air flow direction, and the rear end 1336 may face a downstream side in the air flow direction. For example, when air is moved from the bottom to the top, the front end 1334 of the guide vane 133 may be the bottom, which is the upstream side in the air flow direction, and the rear end 1336 may be the top, which is the downstream side in the air flow direction. The rear end 1336 may be rounded. The front end 1334 may be rounded. For example, the front end 1334 may be bent round from the positive pressure surface 1331 to the negative pressure surface 1335.

Figure 12:
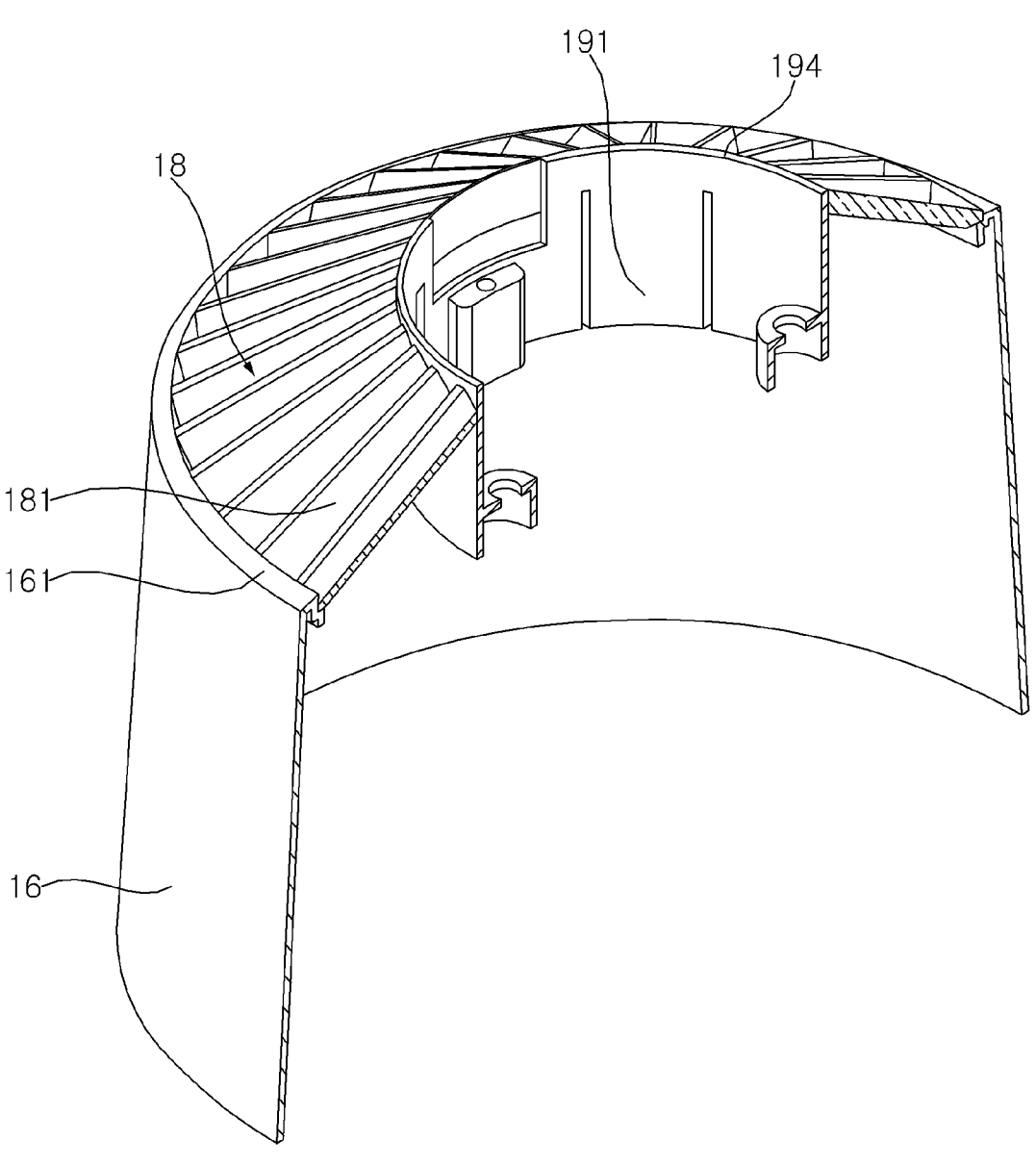
FIG. 12 is a cross-sectional perspective view of an upper housing according to an embodiment of the present disclosure.

Referring to FIG. 12, the upper housing 16 will be described below. The upper housing 16 may be elongated in a height direction of the first body 1. For example, the upper housing 16 may have a cylindrical shape elongated in the height direction of the first body 1. The outlet 17 may be formed at a top of the upper housing 16. An outlet grille 18 may be disposed on the outlet 17.

The upper housing 16 may include at least a portion of the holder 19. The second body 2 may be coupled to the holder 19. The holder 19 may be disposed inside the upper housing 16, and the holder 19 and the upper housing 16 may be connected by the outlet grille 18. For example, the holder 19 may be disposed inside the upper housing 16, the holder 19 and the upper housing 16 may be connected by the outlet grille 18, and a vane 181 of the outlet grille 18 may be radially disposed between a holder wall 191 and the upper housing 16.

The holder 19 may be disposed higher than the upper housing 16. A height of a holder edge 194 may be higher than a height of a housing edge 161. The outlet grille 18 may connect the holder edge 194 and the housing edge 161. The outlet grille 18 may be inclined. An inside of the outlet grille 18 may be elevated, so as to be inclined downward toward the outside. For example, the outlet grille 18 may be connected from the holder edge 194 to the housing edge 161, and may be inclined downward from the holder edge 194 toward the housing edge 161.

The vane 181 may be disposed in an inclined manner. The vane 181 may be connected to the holder edge 194 and the housing edge 194. For example, the vane 181 may be connected from the holder edge 194 to the housing edge 161, and may be inclined downward from the holder edge 194 toward the housing edge 161.

Figure 13:
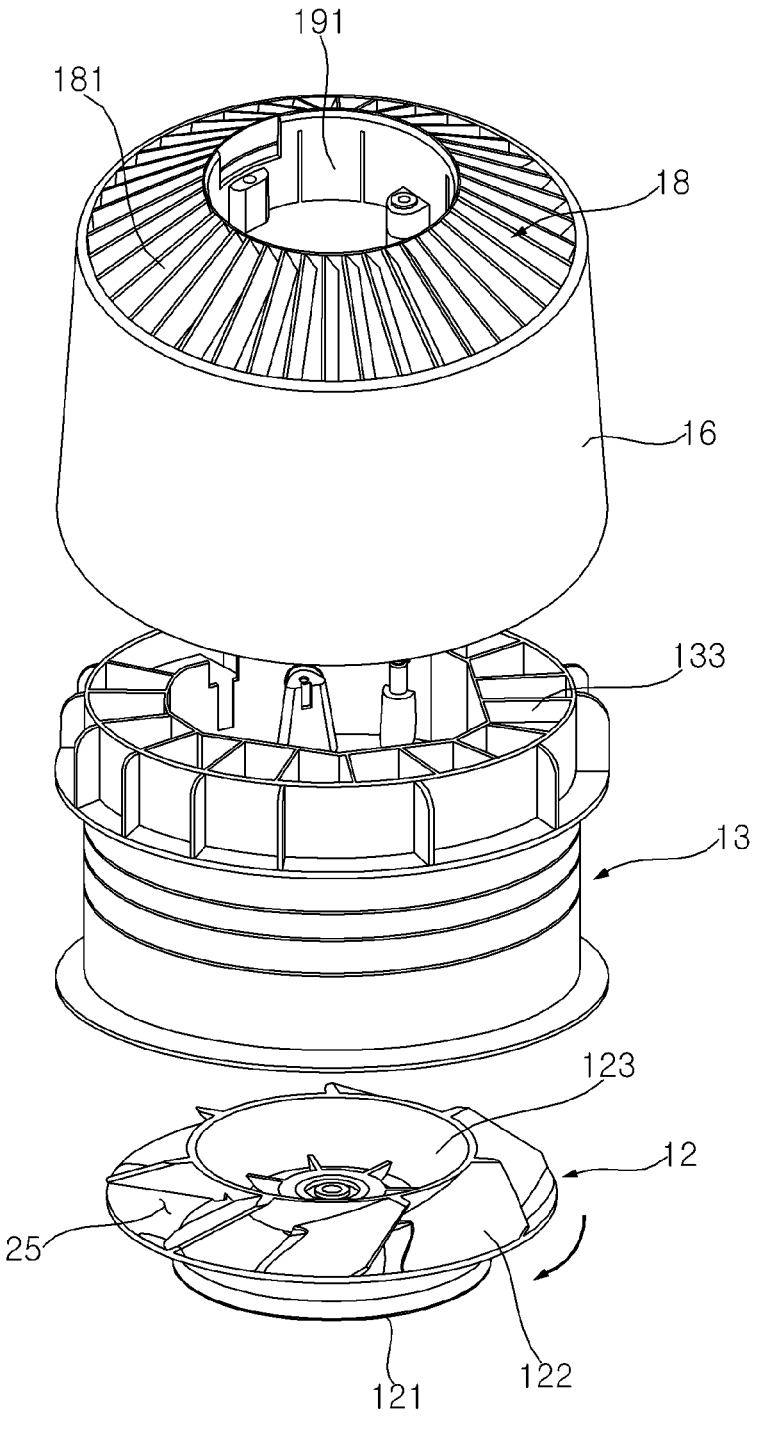
FIG. 13 is a perspective view illustrating an exemplary embodiment of a disassembled state of a blower fan, a blower housing, and an upper housing.

Referring to FIG. 13, a flow direction of air will be described below. Air introduced into the inlet 112 (see FIG. 1) of the first body 1 enters the inlet guide 121 of the blower fan 12. The air introduced into the inlet guide 121 may pass through the blowing hole 125 formed between the hub 123 and the shroud 124 (see FIG. 9), and then be blown in a predetermined direction by the blade 122. The predetermined direction may be the rotation direction of the blower fan 12. The predetermined direction may be a direction opposite to a direction in which the blade 122 is inclined. For example, the blower fan 12 may rotate clockwise, and air that has passed through the blower fan 12 may be discharged while rotating clockwise. For example, the blade 122 of the blower fan 12 may be tilted in a counterclockwise direction, and air that has passed through the blower fan 12 may be discharged while rotating clockwise.

Air that has passed through the blower fan 12 may enter the blowing passage 134 (see FIGS. 7 and 10) of the blower housing 13. The air that has introduced into the blowing passage 134 may reach the plurality of guide vanes 133 radially disposed at the blowing passage 134 with spacing therebetween. The guide vane 133 may be inclined in the predetermined direction, so that the plurality of guide vanes 133 may be radially arranged with spacing therebetween.

The rear end 1336 (see FIG. 11) of the guide vane 133 may face upward, and the front end 1334 (see FIG. 11) of the guide vane 133 may be bent to face downward in a counterclockwise direction. Air that has blown and entered the guide vane 133 by rotating in a spiral shape may be discharged upward. Accordingly, the air may move upward. For example, air that has entered the guide vane 133 located at an upper position by rotating in a clockwise direction from the blower fan 12 may be weakened in rotation by the guide vane 133 while being strengthened in upward straightness.

Air traveling straight upward through the guide vane 133 may pass through the outlet grille 18 located at an upper position. The vane 181 of the outlet grille 18 may be inclined in a predetermined direction, and may be provided in plurality to be arranged radially with spacing therebetween. For example, the plurality of vanes 18 of the outlet grille 18 may each be configured such that the positive pressure surface 182 (see FIGS. 5 and 6) faces downward in a clockwise direction and the negative pressure surface 183 (see FIGS. 5 and 6) faces upward in a counterclockwise direction, and air may be discharged upward while rotating clockwise. As discharged air is discharged upward while rotating in a spiral shape, loss due to friction with the second body 2 disposed at the top may be minimized. Accordingly, the efficiency of the air cleaner 3 may be increased.

Figure 14:
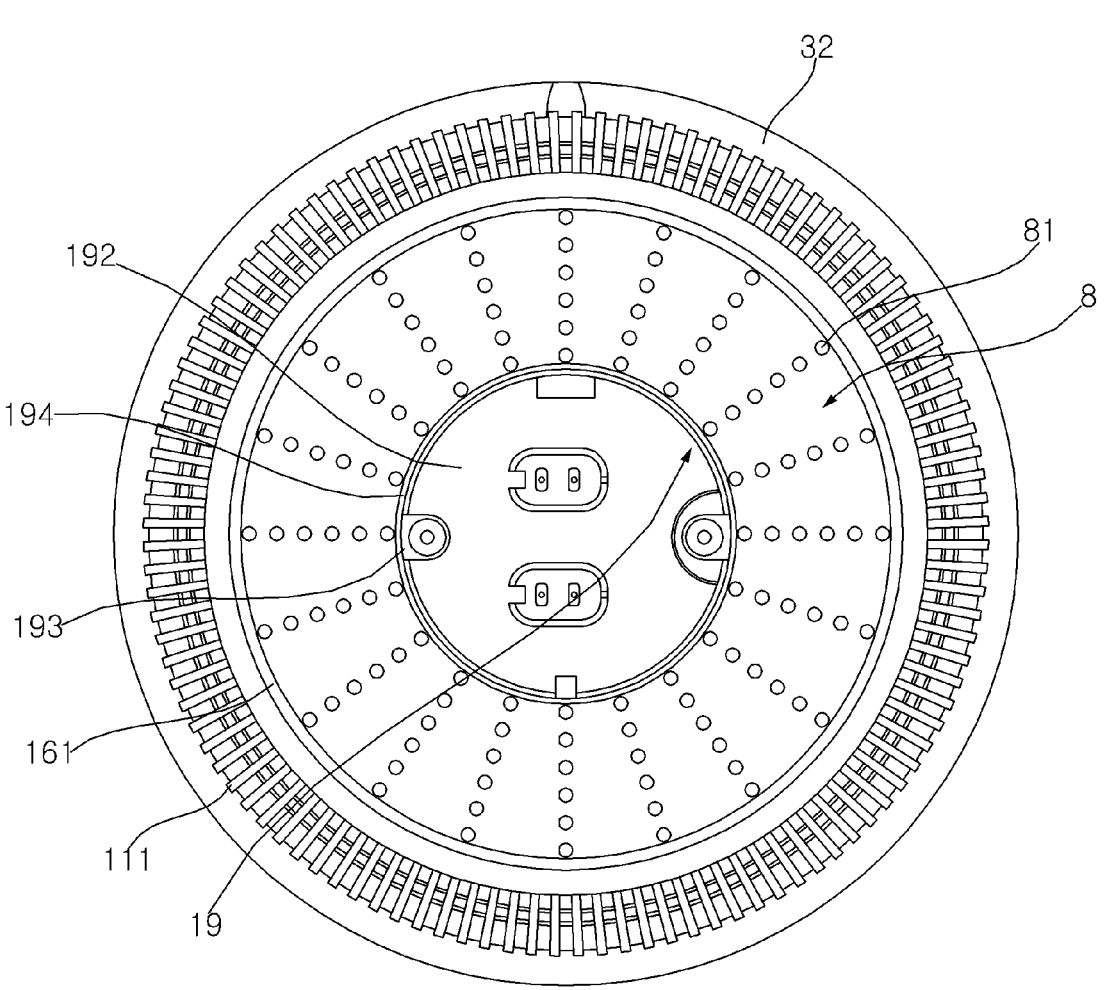
FIG. 14 is a top plan view of an outlet cover according to an embodiment of the present disclosure.

Hereinafter, an example of an outlet cover 8 will be described with reference to FIG. 14. The first body 1 may include an outlet cover 8 disposed on an upper portion thereof. The outlet cover 8 may define an upper surface of the first body 1. The outlet cover 8 may be disposed on the outlet 17 formed in the first body 1. The outlet cover 8 may guide a flow direction of air discharged from the outlet 17.

The outlet cover 8 may correspond to a transverse section of the first body 1. The outlet cover 8 may extend from the circumferential wall of the first body 1 toward the holder 19. The outlet cover 8 may be connected to the housing edge 161 and the holder edge 194 of the first body 1. For example, the first body 1 may have a cylindrical shape, the outlet 17 may have an annular shape open at the top of the first body 1, and the outlet cover 8 may have an annular shape that is disposed on the outlet 17.

The outlet cover 8 may include a guide opening 81. The guide opening 81 may be punched out in the outlet cover 8 so as to intersect a direction in which the outlet cover 8 extends. The guide opening 81 may be formed in a direction perpendicular to a thickness direction of the outlet cover 8, namely, an extension direction of the outlet cover 8. The guide opening 81 may be formed by punching holes in the outlet cover 8. The guide opening 81 may be formed by perforating the outlet cover 8.

The guide opening 81 may be open in the thickness direction of the outlet cover 8. Without being limited thereto, the guide opening 81 may be punched out in the outlet cover 8 into various shapes. For example, the guide opening 81 may be punched out in the outlet cover 8 into the shape of a circular hole. In other examples, the guide opening 81 may be a substantially oval hole, or the guide opening 81 may be punched out in a substantially square shape. In another example, the guide opening 81 may be punched out in a substantially rectangular shape along the extension direction of the outlet cover 8.

The guide opening 81 may be provided in plurality. The plurality of guide openings 81 may be radially disposed with respect to a center of the outlet cover 8. For example, the plurality of guide openings 81 may be radially arranged with respect to an imaginary center of the outlet cover 8. For example, the guide opening 81 may be annularly punched out along a circumferential direction of the outlet cover 8.

Figure 15:
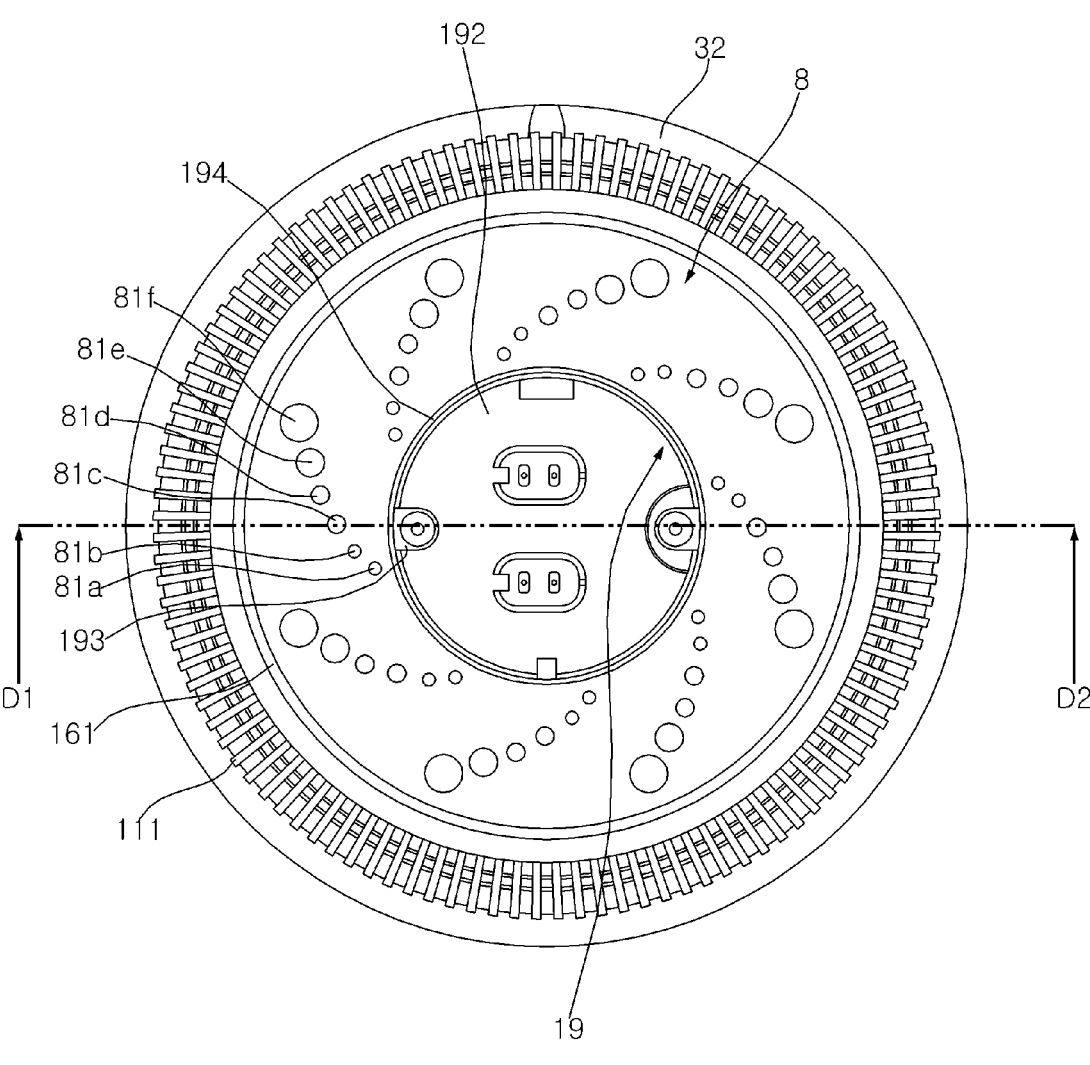
FIG. 15 is a top plan view of an outlet cover according to another embodiment of the present disclosure.

Hereinafter, another example of the outlet cover 8 will be described with reference to FIG. 15. The guide opening(s) 81 may be provided in an outlet cover 8 into a spiral shape. The guide opening 81 may be disposed to be inclined along a circumferential direction of the outlet cover 8. Guide openings 81 may be disposed toward an outer circumferential end from an inner circumferential end of the outlet cover 8 to be spaced apart from each other in the circumferential direction of the outlet cover 8.

The guide opening 81 may be provided in plurality. The plurality of guide openings 81 may have different sizes. The plurality of guide openings 81 may increase in size from the inner circumferential end to the outer circumferential end. The plurality of guide openings 81 may decrease in size from the outer circumferential end to the inner circumferential end. For example, the size of the guide opening 81 may decrease as a distance from the center of the first body 1 decreases. As the size of the guide opening adjacent to the inner circumferential end is smaller, the speed of air flow passing through the guide opening increases, thereby increasing the Coanda effect through the guide wall. Accordingly, discharge air flow control performance of the air cleaner may be improved.

Figure 16:
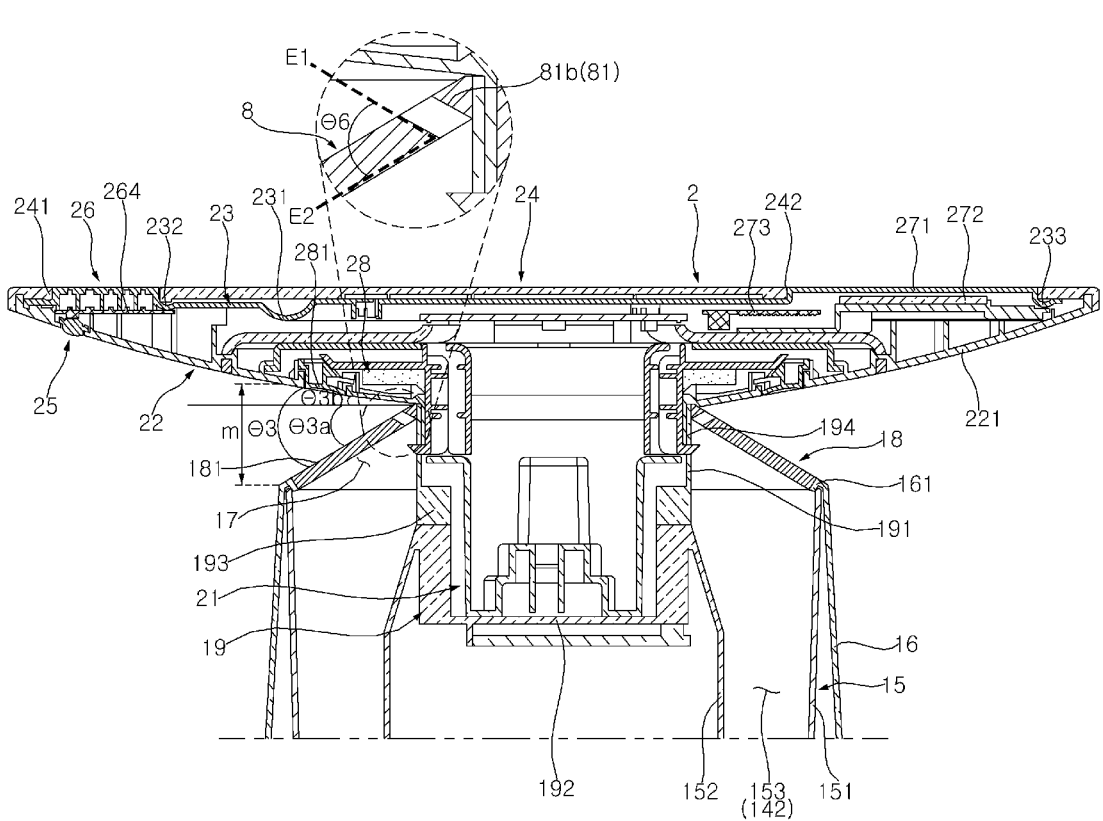
FIG. 16 is a cross-sectional view of an air cleaner taken along a line D1-D2 of FIG. 15.

Referring to FIG. 16, the outlet cover 8 will be described below. The outlet cover 8 may extend from the bottom to the top. The outlet cover 8 may be connected to the housing edge 161 and the holder edge 194. The outlet cover 8 may extend from the housing edge 161 to the holder edge 194. The outlet cover 8 may extend from the holder edge 194 to the housing edge 161. The holder edge 194 may be positioned above the housing edge 161. The outlet cover 8 may extend upward toward the inside of the first body 1. The outlet cover 8 may be inclined downward from the center of the first body 1 to the outside of the first body 1. An extension direction E2 of the outlet cover 8 may be parallel to an upper surface of the outlet cover 8. An imaginary straight line in the extension direction E2 of the outlet cover 8 may come into contact with the upper surface of the outlet cover 8.

The guide opening 81 may pass through the outlet cover 8. The guide opening 81 may be formed in a thickness direction of the outlet cover 8. The guide opening 81 may open at the top. The guide opening 81 may be inclined inward from an outside of the outlet cover 8. The guide opening 81 may be inclined from an outer top of the first body 1 to an inner bottom of the first body 1. The guide opening 81 may be inclined from the inner bottom of the first body 1 to the outer top of the first body 1. The guide opening 81 may face the guide wall 221 inside the first body 1. The guide opening 81 may face the guide wall 221. An air flow discharged through the guide opening 81 may collide with the guide wall 221.

The guide opening 81 may be inclined upward in the radial direction of the first body 1. In other words, the guide opening 81 may be extended upward in the radial direction of the first body. An extension direction of the guide opening may be a direction in which the guide opening is punched. An inclined direction E1 of the guide opening 81 and the extension direction E2 of the outlet cover 8 may form an acute angle Θ6. For example, the extension direction E1 of the guide opening and the extension direction E2 of the outlet cover 8 may form an acute angle Θ6. The guide opening 81 may be inclined upward relative to the radial direction of the first body 1. The guide opening 81 may be inclined in the radial direction with respect to a direction perpendicular to the outlet cover 8.

Referring to FIGS. 1 to 16, an air cleaner according to an aspect of the present disclosure includes: a first body having an inlet and an outlet that is open at top; a filter disposed inside the first body and facing the inlet; a blower fan disposed between the inlet and the outlet, inside the first body, to generate an air flow from the inlet to the outlet; a blower motor disposed inside the first body and configured to rotate the blower fan; and a second body spaced upward from the outlet and disposed over the first body. The first body may include an outlet grille that is disposed on the outlet and has a plurality of vanes extending from an upper end of a circumferential wall of the first body toward a central portion of the first body. The outlet grille may be inclined upward toward the central portion of the first body from the circumferential wall of the first body.

According to another aspect of the present disclosure, the second body may include a post connected to the first body, and the plurality of vanes may each be configured such that one end thereof adjacent to the post is disposed higher than another end thereof.

According to another aspect of the present disclosure, the first body may include, on an upper side thereof, a holder into which the post of the second body is inserted. An upper end of the holder may be disposed higher than the upper end of the circumferential wall of the first body. The plurality of vanes may each be configured such that one end thereof is connected to the upper end of the holder and another end thereof is connected to the upper end of the circumferential wall of the first body.

According to another aspect of the present disclosure, the holder may be disposed at a position corresponding to a center in a height direction of the first body, and the plurality of vanes may be radially disposed between the holder and the circumferential wall of the first body. According to another aspect of the present disclosure, the first body may further include a cover extending downward from the holder. The cover may have an outer circumferential end whose diameter increases downward and may be convex in a radial direction.

According to another aspect of the present disclosure, the circumferential wall of the first body may be inclined inward toward a top, and an angle at which a vane among the plurality of vanes is inclined with respect to an up-and-down direction may be greater than an angle at which the circumferential wall of the first body is inclined inward with respect to the up-and-down direction.

Referring to FIGS. 1 to 16, an air cleaner according to an aspect of the present disclosure includes: a first body having an inlet and an outlet that is open at top; a filter disposed inside the first body and facing the inlet; a blower fan disposed between the inlet and the outlet, inside the first body, to generate an air flow from the inlet to the outlet; a blower motor disposed inside the first body and configured to rotate the blower fan; and a second body spaced upward from the outlet and disposed over the first body. The first body may include an outlet grille that is disposed on the outlet and has a plurality of vanes extending from an upper end of a circumferential wall of the first body toward a central portion of the first body. The second body may include a guide wall that is spaced upward from the outlet grille and extends laterally to face downward. A separation distance between the outlet grille and the guide wall in an up-and-down direction may increase toward an outside in a radial direction of the first body.

According to another aspect of the present disclosure, the guide wall may extend upward as a distance from a center of the first body increases, and the outlet grille may be inclined downward as the distance from the center of the first body increases. According to another aspect of the present disclosure, an outer circumferential end of the guide wall may be located outward relative to an outer circumferential end of the outlet grille.

According to another aspect of the present disclosure, the guide wall may be a curved surface that is convex downward, and the plurality of vanes may each have a bar shape that extends downward toward the outside in the radial direction of the first body. According to another aspect of the present disclosure, an angle between an extension direction of the guide wall and a longitudinal direction of a vane among the plurality of vanes may be an acute angle.

According to another aspect of the present disclosure, an angle between a longitudinal direction of a vane among the plurality of vanes and the radial direction of the first body may be greater than an angle between an extension direction of the guide wall and the radial direction of the first body. According to another aspect of the present disclosure, an imaginary straight line that connects a lower end in a longitudinal direction of a vane among the plurality of vanes and an end of the guide wall forms an obtuse angle with the longitudinal direction of the vane.

According to another aspect of the present disclosure, the plurality of vanes may each be inclined such that an air flow blown up by the blower fan is discharged obliquely upward along a circumferential direction of the first body. According to another aspect of the present disclosure, the circumferential direction of the first body may correspond to a rotation direction of the blower fan.

According to another aspect of the present disclosure, the air cleaner may further include a plurality of guide vanes disposed between the blower fan and the outlet, inside the first body. The plurality of guide vanes may be inclined in the circumferential direction of the first body to be radially arranged with respect to an axis of the blower fan. The plurality of vanes may be inclined in a direction corresponding to a direction in which the plurality of guide vanes are inclined, so as to be radially disposed at the outlet grille.

Referring to FIGS. 1 to 16, an air cleaner according to an aspect of the present disclosure includes: a first body having an inlet and an outlet; a filter disposed inside the first body and facing the inlet; a blower fan disposed between the inlet and the outlet, inside the first body, to generate an air flow from the inlet to the outlet; a blower motor disposed inside the first body and configured to rotate the blower fan; and a second body disposed over the first body. The first body may include an outlet cover that is disposed at an upper portion of the first body and has a guide opening punched out therein. The outlet cover may extend upward toward an inside of the first body.

According to another aspect of the present disclosure, the guide opening may be inclined upward in a radial direction of the first body. According to another aspect of the present disclosure, the guide opening may form an acute angle with an extension direction of the outlet cover. According to another aspect of the present disclosure, the guide opening may decrease in size as a distance from a center of the first body decreases.

Referring to FIGS. 1 to 16, an air cleaner according to an aspect of the present disclosure includes: a first body having an inlet and an outlet that is open at top; a blower fan disposed below the outlet inside the first body and configured to generate an air flow from the inlet to the outlet; and a blower motor disposed inside the first body and configured to rotate the blower fan. The outlet may be obliquely open at top in a rotation direction of the blower fan.

It is an aspect of the present disclosure to solve the above and other problems. Another aspect of the present disclosure may be to improve the efficiency of an air cleaner. Another aspect of the present disclosure may be to provide an air cleaner that can prevent air discharged from an outlet from being reintroduced into an inlet. Another aspect of the present disclosure may be to provide an air cleaner with improved discharged air control performance. Another aspect of the present disclosure may be to provide an air cleaner with improved space utilization. Another aspect of the present disclosure may be to provide an air cleaner that can allow a top space thereof to be utilized. Another aspect of the present disclosure may be to provide an air cleaner with decreased flow interference with discharged air. Another aspect of the present disclosure may be to provide an air cleaner that can improve the convenience and comfort of an occupant (user). The aspects of the present disclosure are not limited to the aspects described above, and other aspects not stated herein will be clearly understood by those skilled in the art from the following description.

In accordance with an aspect of the present disclosure, an air cleaner includes: a first body having an inlet and an outlet; a filter disposed inside the first body; a blower fan disposed inside the first body; a blower motor configured to rotate the blower fan; and a second body disposed over the first body. In some implementations, the first body may include an outlet grille that is disposed on the outlet and has a plurality of vanes extending from an upper end of a circumferential wall of the first body toward a central portion of the first body.

In some implementations, the outlet grille may be inclined upward toward the central portion of the first body from the circumferential wall of the first body. In some implementations, the second body may include a post connected to the first body. In some implementations, the plurality of vanes may each be configured such that one end thereof adjacent to the post is disposed higher than another end thereof.

In some implementations, the first body may include, on an upper side thereof, a holder into which the post of the second body is inserted. In some implementations, an upper end of the holder may be disposed higher than an upper end of the circumferential wall of the first body. In some implementations, the plurality of vanes may each be configured such that one end thereof is connected to the upper end of the holder and another end thereof is connected to the upper end of the circumferential wall of the first body.

In some implementations, the second body may include a guide wall that is spaced upward from the outlet grille and extends laterally to face downward. In some implementations, a separation distance between the outlet grille and the guide wall in an up-and-down direction may increase toward an outside in a radial direction of the first body. In some implementations, the guide wall may extend upward as a distance from a center of the first body increases. In some implementations, the outlet grille may be inclined downward as the distance from the center of the first body increases.

In some implementations, the first body may include an outlet cover that is disposed at an upper portion of the first body and has a guide opening punched out therein. In some implementations, the outlet cover may extend upward toward an inside of the first body. In some implementations, the guide opening may be inclined upward in a radial direction of the first body.

Details of other embodiments are included in the detailed description and the accompanying drawings. According to at least one of the embodiments of the present disclosure, as an outlet grille is inclined in a direction opposite to a guide wall, loss of discharged air may be prevented, thereby improving the efficiency of an air cleaner. According to at least one of the embodiments of the present disclosure, as a guide wall of a second body guides air discharged from an outlet, discharged air control performance may be improved.

According to at least one of the embodiments of the present disclosure, as an end of a guide wall of a second body is located outward than a circumferential surface of a first body, discharged air may be away from an inlet, thereby preventing the discharged air from being reintroduced into the inlet. According to at least one of the embodiments of the present disclosure, as an inlet and an outlet are disposed to be spaced apart from each other, discharged air may be suppressed from being reintroduced into the inlet.

According to at least one of the embodiments of the present disclosure, space utilization may be improved due to a second body. According to at least one of the embodiments of the present disclosure, space utilization may be improved by a flat surface formed at a top of an air cleaner. According to at least one of the embodiments of the present disclosure, as a vane of an outlet grille is disposed obliquely, flow interference of discharged air may be reduced.

The aspects of the present disclosure are not limited to the effects described above, and other aspects not mentioned will be clearly understood by those skilled in the art from the claims.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings, and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings, and the appended claims. In addition to variations and modifications in the component parts and/or arrangements, alternative uses will also be apparent to those skilled in the art.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air cleaner comprising:
a first body including an inlet, and an outlet that is open upward;
a filter provided inside the first body and facing the inlet;
a blower fan provided between the inlet and the outlet to generate an air flow from the inlet to the outlet;
a blower motor provided inside the first body and configured to rotate the blower fan; and
a second body spaced upward from the outlet and provided over the first body,
wherein the first body includes an outlet grille that is provided at the outlet and that has a plurality of vanes extending from an upper end of a circumferential wall of the first body toward a central axis of the first body,
wherein the outlet grille is inclined upward toward the central axis of the first body from the circumferential wall of the first body,
wherein the second body includes a post configured to be connected to the first body, and
wherein a vane among the plurality of vanes includes a first end and a second end, the first end being relatively closer to the post than the second end, and the first end being positioned higher than the second end.

2. The air cleaner of claim 1,
wherein the first body includes, on an upper side thereof, a mount into which the post of the second body is inserted,
wherein an upper end of the mount is higher than the upper end of the circumferential wall of the first body, and
wherein the first end of the vane is connected to the upper end of the mount, and the second end of the vane is connected to the upper end of the circumferential wall of the first body.

3. The air cleaner of claim 2, wherein the mount is provided at a position corresponding to a center axis of the first body, and
wherein the plurality of vanes extend radially between the mount and the circumferential wall of the first body.

4. The air cleaner of claim 2, further comprising an inner cover extending downward from the mount, wherein the inner cover has an outer circumferential surface whose diameter increases downward and is convex in a radial direction.

5. The air cleaner of claim 1,
wherein the circumferential wall of the first body is inclined inward toward a top of the first body, and
wherein an angle at which the vane among the plurality of vanes is inclined with respect to a vertical direction is greater than an angle at which the circumferential wall of the first body is inclined inward with respect to the vertical direction.

6. An air cleaner comprising:
a first body having an inlet and an outlet at an upper region of the first body;
a filter provided inside the first body and facing the inlet;
a blower fan between the inlet and the outlet to generate an air flow from the inlet to the outlet;
a blower motor provided inside the first body and configured to rotate the blower fan; and
a second body spaced upward from the outlet and provided over the first body,
wherein the first body includes an outlet grille that is provided on the outlet and that has a plurality of vanes extending from an upper end of a circumferential wall of the first body toward a central axis of the first body,
wherein the second body includes a guide wall that is spaced upward from the outlet grille, extends laterally, and faces downward,
wherein a separation distance between the outlet grille and the guide wall in a vertical direction increases radially away from a center axis of the first body,
wherein the guide wall of the second body is inclined to extend upward as a distance from the center axis of the first body increases, and
wherein the outlet grille is inclined to extend downward as the distance from the center axis of the first body increases.

7. The air cleaner of claim 6, wherein an outer circumferential end of the guide wall of the second body is located further outward from the center axis of the first body relative to an outer circumferential end of the outlet grille.

8. The air cleaner of claim 6, wherein an angle between an extension direction of the guide wall of the second body and a longitudinal direction of a vane among the plurality of vanes is an acute angle.

9. The air cleaner of claim 6, wherein an angle between a longitudinal direction of a vane among the plurality of vanes and a horizontal plane extending through an upper region of the outlet grille is greater than an angle between an extension direction of the guide wall of the second body and the horizontal plane extending through an upper region of the outlet grille.

10. The air cleaner of claim 6, wherein a line that connects a lower end of a vane among the plurality of vanes and an end of the guide wall of the second body form an obtuse angle with a longitudinal direction of the vane.

11. A air cleaner comprising:

a first body having an inlet and an outlet at an upper region of the first body;

a filter provided inside the first body and facing the inlet;

a blower fan between the inlet and the outlet to generate an air flow from the inlet to the outlet;

a blower motor provided inside the first body and configured to rotate the blower fan; and a second body spaced upward from the outlet and provided over the first body, wherein the first body includes an outlet grille that is provided on the outlet and that has a plurality of vanes extending from an upper end of a circumferential wall of the first body toward a central axis of the first body, wherein the second body includes a guide wall that is spaced upward from the outlet grille, extends laterally, and faces downward, wherein a separation distance between the outlet grille and the guide wall in a vertical direction increases radially away from a center axis of the first body, wherein the guide wall of the second body is a curved surface that is convex downward, and wherein the plurality of vanes each have a bar shape that extends downward radially outward from the center axis of the first body.

12. A air cleaner comprising:

a first body having an inlet and an outlet at an upper region of the first body;

a filter provided inside the first body and facing the inlet;

a blower fan between the inlet and the outlet to generate an air flow from the inlet to the outlet;

a blower motor provided inside the first body and configured to rotate the blower fan; and a second body spaced upward from the outlet and provided over the first body, wherein the first body includes an outlet grille that is provided on the outlet and that has a plurality of vanes extending from an upper end of a circumferential wall of the first body toward a central axis of the first body, wherein the second body includes a guide wall that is spaced upward from the outlet grille, extends laterally, and faces downward, wherein a separation distance between the outlet grille and the guide wall in a vertical direction increases radially away from a center axis of the first body, and wherein the plurality of vanes are each rotated along a longitudinal direction such that the air flow from the blower fan is discharged obliquely upward along a circumferential direction of the first body.

13. The air cleaner of claim 12, wherein the circumferential direction of the first body corresponds to a rotation direction of the blower fan.

14. The air cleaner of claim 12, further comprising a plurality of guide vanes provided between the blower fan and the outlet inside the first body, wherein the plurality of guide vanes are inclined in the circumferential direction of the first body to be radially arranged with respect to an axis of the blower fan, and wherein the plurality of vanes are each rotated along an extension direction in a rotational direction corresponding to a direction in which the plurality of guide vanes are inclined, so as to be radially provided at the outlet grille.

15. An air cleaner comprising:

a first body having an inlet and an outlet;

a filter provided inside the first body and facing the inlet;

a blower fan between the inlet and the outlet to generate an air flow from the inlet to the outlet;

a blower motor provided inside the first body and configured to rotate the blower fan; and a second body provided over the first body, wherein the first body comprises an outlet cover that is provided at an upper portion of the first body and includes a guide opening formed therein, wherein the outlet cover extends upward toward a central axis of the first body, and wherein the outlet cover includes a plurality of the guide openings, and sizes of the guide openings decrease in an inward direction toward a center axis of the first body.

16. The air cleaner of claim 15, wherein the guide opening is inclined upward in an inward radial direction of the first body.

17. The air cleaner of claim 15, wherein the guide opening forms an acute angle with respect to an extension direction of the outlet cover.

* * * * *